(12) United States Patent
Jolly

(10) Patent No.: US 10,397,322 B2
(45) Date of Patent: Aug. 27, 2019

(54) MOBILE AND COMPUTER APPLICATIONS, SYSTEMS AND METHODS FOR LARGE GROUP TRAVEL AND EVENT MANAGEMENT

(71) Applicant: Sunmeet Singh Jolly, San Jose, CA (US)

(72) Inventor: Sunmeet Singh Jolly, San Jose, CA (US)

( * ) Notice: Subject to any disclaimer, the term of this patent is extended or adjusted under 35 U.S.C. 154(b) by 0 days.

(21) Appl. No.: 16/197,355

(22) Filed: Nov. 21, 2018

(65) Prior Publication Data

US 2019/0158587 A1 May 23, 2019

Related U.S. Application Data

(60) Provisional application No. 62/589,149, filed on Nov. 21, 2017.

(51) Int. Cl.
| | |
|---|---|
| *H04W 4/50* | (2018.01) |
| *H04L 29/08* | (2006.01) |
| *H04W 4/20* | (2018.01) |
| *G06F 8/61* | (2018.01) |

(52) U.S. Cl.
CPC ...... *H04L 67/1095* (2013.01); *H04L 67/1097* (2013.01); *H04L 67/26* (2013.01); *H04W 4/20* (2013.01); *H04W 4/50* (2018.02); *G06F 8/61* (2013.01)

(58) Field of Classification Search
CPC .. H04W 4/50; H04L 67/1095; H04L 67/1097; H04L 67/00; H04L 67/10
See application file for complete search history.

(56) References Cited

U.S. PATENT DOCUMENTS

| | | | | |
|---|---|---|---|---|
| 2007/0192168 | A1* | 8/2007 | Van Luchene | G06Q 10/047 705/14.54 |
| 2014/0282016 | A1* | 9/2014 | Hosier, Jr. | H04W 4/08 715/733 |
| 2014/0295822 | A1* | 10/2014 | Koo | G06Q 20/3278 455/420 |

* cited by examiner

*Primary Examiner* — Said M Elnoubi

(57) ABSTRACT

Systems and Methods that help in Group travel and Event management, initially embodied as GROTU mobile app built for iOS and Android platforms. GROTU uses computer networking, internet cloud and mobile smartphone's camera, computing power, storage and graphical user interface abilities to help users in creating travel surveys from prebuilt, customizable template for voting on group choices; organizing photos and external storage hyperlinks in photo albums stored in cloud; group expenditure management using smartphone camera for photo receipts uploading while calculating, storing and helping in settlement of group expenses; sending event invitations via SMS, Email and Push Notifications including potluck items management; and providing users with organized chatting ability to have private discussions while planning group events and trips. GROTU eliminates the need for linking spreadsheets and online forms on chat apps for planning and managing group travel and events.

7 Claims, 23 Drawing Sheets

MOBILE AND COMPUTER APPLICATIONS, SYSTEMS AND METHODS FOR LARGE GROUP TRAVEL AND EVENT MANAGEMENT

CROSS-REFERENCE TO RELATED APPLICATIONS

This application claims the benefit of Provisional Patent Application Ser. No. 62/589,149 filed Nov. 21, 2017 by the present inventor, which is incorporated by reference.

BACKGROUND

Prior Art

The following is a tabulation of some prior art that presently appears relevant:

| U.S. Patents | | |
| --- | --- | --- |
| Pat. No. | Issue Date | Patentee |
| U.S. Pat. No. 8,244,848 B1 | Aug. 14, 2012 | Narayanan et al. |
| U.S. Pat. No. 8,498,900 B1 | Jul. 30, 2013 | Spirin et al. |
| U.S. Pat. No. 8,863,245 B1 | Oct. 14, 2014 | Abhyanker |
| U.S. Pat. No. 9,123,038 B2 | Sep. 1, 2015 | Cozens et al. |
| U.S. Pat. No. 9,294,623 B2 | Mar. 22, 2016 | Oberoi et al. |
| U.S. Pat. No. 9,355,394 B2 | May 31, 2016 | Gupta |
| U.S. Pat. No. 9,552,558 B2 | Jan. 24, 2017 | Pinard |
| U.S. Pat. No. 9,654,288 B1 | May 16, 2017 | Howell et al. |
| U.S. Pat. No. 9,704,109 B2 | Jul. 11, 2017 | Geraci et al. |
| U.S. Pat. No. 9,704,110 B2 | Jul. 11, 2017 | Shaw et al. |
| U.S. Pat. No. 9,710,801 B2 | Jul. 18, 2017 | Aadi et al. |
| U.S. Pat. No. 9,712,468 B2 | Jul. 18, 2017 | Patel |

| U.S. Patent Application Publications | | |
| --- | --- | --- |
| Publication No. | Pub. Date | Applicant |
| U.S. 2009/0055488 A1 | Feb. 26, 2009 | Berry et al. |
| U.S. 2013/0297692 A1 | Nov. 7, 2013 | Raji et al. |
| U.S. 2013/0298043 A1 | Nov. 7, 2013 | Bailey |
| U.S. 2013/0330019 A1 | Dec. 12, 2013 | Kim et al. |
| U.S. 2014/0236647 A1 | Aug. 21, 2014 | Wettan |
| U.S. 2014/0278593 A1 | Sep. 18, 2014 | Brunn |
| U.S. 2014/0343990 A1 | Nov. 20, 2014 | Photowat |
| U.S. 2016/0162945 A1 | Jun. 9, 2016 | Turner et al. |
| U.S. 2017/0286941 A1 | Oct. 5, 2017 | Aadi et al. |
| U.S. 2017/0316524 A1 | Nov. 2, 2017 | Amzallag et al. |

Billions of people are now connected in Groups via Chat apps and other Social media apps and websites. People form groups based on relations, affiliations, interests etc. An individual can be a member of multiple private groups including connections among Colleagues, School Friends, College Friends, Family, Club members, Sports meet members, Religious group, Neighborhood group etc. While Chat apps and Social media websites are optimized for faster, cheaper Communication among group members, they are ill equipped to help in Organizing Travel and Events especially where data organization or analytics becomes essential.

Group travel, Parties, Potluck dinners, Weekend getaways, Cruises, Picnics, Sports meets, Festival celebrations and other gatherings are becoming larger in size due to easy communication among group members using chat or social media. It's easy to call out in a 50 people chat group "Hey, let's go somewhere during this Christmas break!" and 20 friends say "Yes, lets plan it!". The complexity to organize increases many folds because of choices available, Group member preferences and Group size. Where to go? When? Who to take along? Activities? Budget? Transportation? Accommodation? Trip length? Flights? Shared Responsibilities? Expense sharing? etc. Conflict arises if Group member voices are not heard, and current Social media and chat platforms are not adequately equipped to handle group surveys, manage group expenditure, manage shared responsibility assignment and organize photos.

A very popular chat app used by over a billion people sends messages, photos, links etc. to users as they keep coming from other users in group. Jokes, Discussions, Forwarded News, Videos, Photos, Links to other internet sites, all make up a part of daily chat volume. Sometimes a few group members get into heated discussion and the chat volume spikes regardless of the interest of other group members. But there is no way for others to sort and filter out meaningful information without reading every message. Some people get busy for few days and switch off from chat because they can't keep pace with it. Will they miss your Potluck invitation? If your event is 3 weeks later, will you keep reading all chat messages for next 3 weeks to find RSVP information and writing down who's bringing what to the potluck? How will other group members know who is bringing what to party and what's still left to be brought? That means everyone has to read all messages to keep up, and take notes. And all this while your group members not attending your event waste their time looking at your event RSVP and potluck items in chat.

Its normal after a large group travel or event to share photos in the chat group where it all initiated. But if you do not save those in your device, they will be lost like needles in haystack in few days depending on chat volume. Try going back 3 months to look for Group pictures of a party you had with your chat group buddies. It's possible that photos have been deleted to save mobile phone memory. There are other social media sites that store photo albums and let you share with friends, but do not provide ability to store hyperlinks to external storage where your other friends might want to store their pictures. They also require membership and connection between friends, but provide limited control over who can see your photos on internet. For instance, if my friend requests me to add trip photos to her album, she (not I) can chose its privacy setting to be visible to public or her other friends.

Also, some social media sites run massive advertising, which you "have to" see in order to access your own photos or a friend's photo albums. They do not yet offer an ad-free version for people who would rather pay a subscription fee to avoid seeing too many commercials.

Another frequent requirement of Group Travel and Events planning is a need to manage expenses. The group may be planning an event with shared responsibilities of sourcing party items. One group member orders restaurant food (larger expense), while other might be buying Liquor and other take on DJ and Photography expense and someone buys soft drinks and pizza while others buy nothing but want to pay their dues. Similarly, when on large group travel, a few friends might go to bar for a drink while larger group will pay for dinner at restaurant. A subset of group wants to go on Boy's fishing trip while ladies enjoy a show. Many merchants refuse to split bill into more than certain number of credit cards as it's an overhead for their already busy staff to run multiple cards and seek signatures. Also, if not stored safely, Expense receipts can get lost while on a trip, and you may forget about cash transactions unless recorded somewhere. But many people do not take computer or have access to scanner on trips.

Technology savvy people have used a mix of what's available in consumer technology to solve some of these problems. We discussed chat apps already. Some people use Online spreadsheets to prepare a list of Potluck items and provide link to friends in chat group. Spreadsheets have also been used for sharing expenses for group events. But the link can get lost like needle in haystack of daily chat volume. Similarly, to create survey among friends, one group member volunteers and creates an online survey using online forms, where they type all questions and answer choices and provide link to survey on chat window. Again, that link can get lost in daily chat volume.

Another problem with linking online spreadsheets and forms in mobile chat windows is that they open in mobile's web browser. The user experience (UX) is horrible as most of these websites and forms are not optimized to be viewed in mobile web browsers. They are awfully slow to load and page formatting does not fit small mobile phone screens. The buttons, links and text entry is nightmare in websites that open in mobile web browsers.

A lot of these consumer facing technologies were first built to be accessed on Internet browsers and are now being customized for mobile phones in last few years. But they are far from achieving performance and user experience levels that are achieved by Mobile apps that are custom built, optimized and tested for their respective mobile hardware platforms. In short, its much quicker and more user friendly to access information on your bank's mobile app on your phone, than to access their website on your mobile phone browser, because websites are optimized for laptop or desktop web browsers (large screens with Wi Fi connection) and not for smaller mobile screens, operating while on cellular network.

Trusted research has shown that more than 80% of social interactions happen on mobile phones. And there is technology fatigue among consumers when it comes to linking too many technologies together or using too many different apps and websites. For example, if all the use cases mentioned above and listed problems were being solved by separate mobile apps, users will need to download and learn using many such apps, have separate login and passwords, friend lists and connections in each. And significant resources will be wasted in marketing and acquiring users for variety of technologies and apps making it unviable for app publishers. Since group events and travel planning largely happens among close connections, there is need for a single mobile app for these use cases.

That convinced us to build GROTU mobile app for iOS and Android platforms from grounds up. We have made a humble attempt to solve problems listed above, and designed and made available GROTU app to be used worldwide by groups planning travel and events frequently.

SUMMARY OF THE INVENTION

In first released embodiment of the invention, GROTU mobile app, the Group Travel and Event management application solves each of these problems by using Computer networking, Internet cloud and Mobile smartphone's camera, computing power, storage and graphical user interface abilities helping users in 1) Creating Travel surveys from pre-built, customizable template for voting on Group choices 2) Organize photos and external storage hyperlinks in photo albums that can be organized by trips and events and stored in cloud 3) Group expenditure management using smartphone camera for photo receipts uploading 4) Calculation, storage and settlement of funds including maintaining ledger balance for each active expense report 5) Event Invitations via SMS, Email and Push Notifications including Potluck items management with cloud sync for real time updates to group members 6) Organized group chat specific to an event or trip plan 7) Easy search, filter and deletion of records by organizing and storing data and files in database in cloud.

GROTU saves users significant time and effort by passing relevant data between its different modules. For instance, after an event (or trip) is over, you can invite the members of that event (or trip) directly into Expense report, or shared Photo album. Similarly, GROTU saves a list of user's frequently invited friends so users don't have to search for phone book entries each time an invitation needs to be sent out.

GROTU app can be downloaded from Apple app store for use on iOS phones and tablets (iPhone, iPad) and from Google Play store for use on Android phones and tablets. Majority of world today uses either Android or iOS mobile devices, and GROTU app works efficiently between these devices syncing data and images back and forth with internet cloud servers using AWS (Amazon Web Services) computing and storage backend.

DRAWINGS—FIGURES

Figure 3:
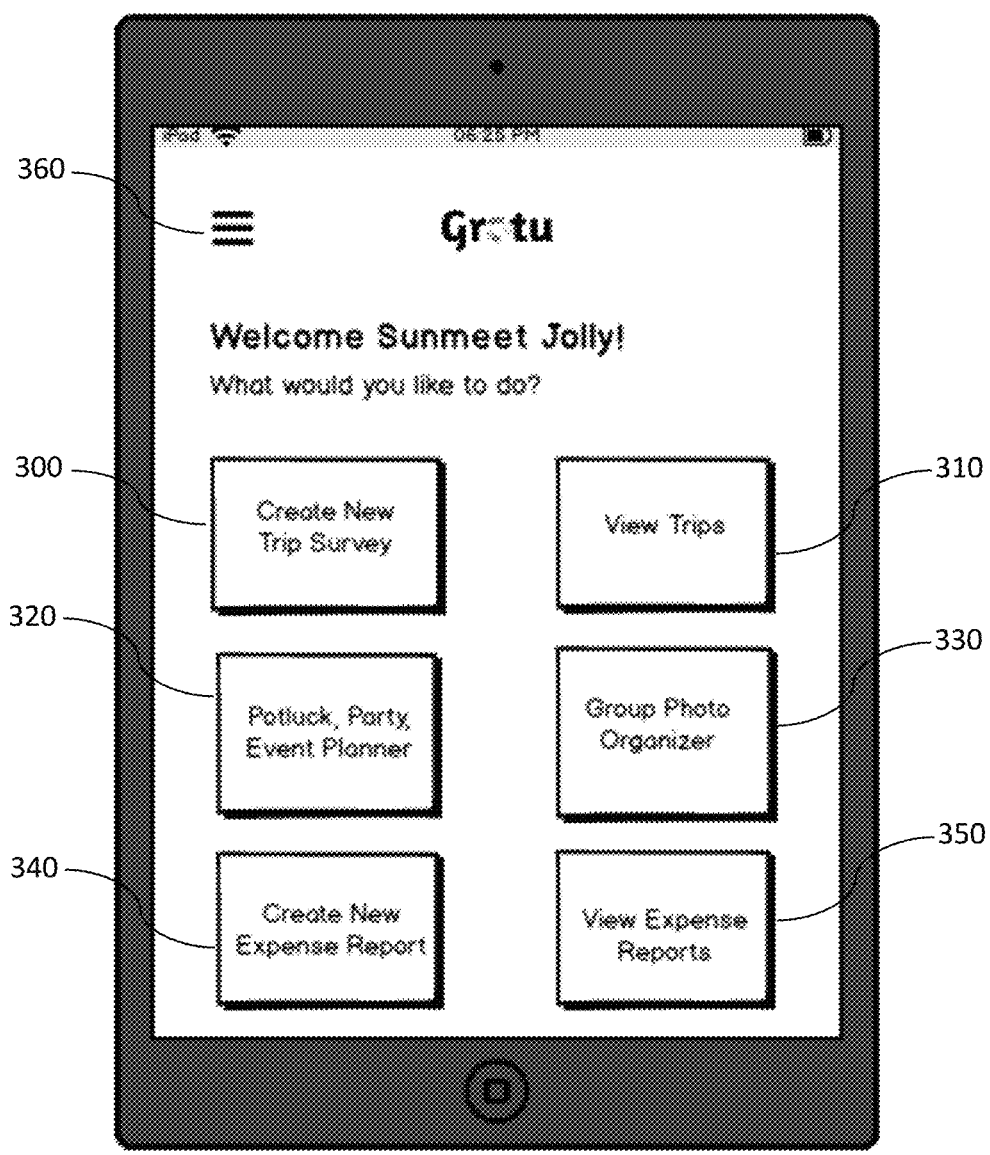
Figure 4:
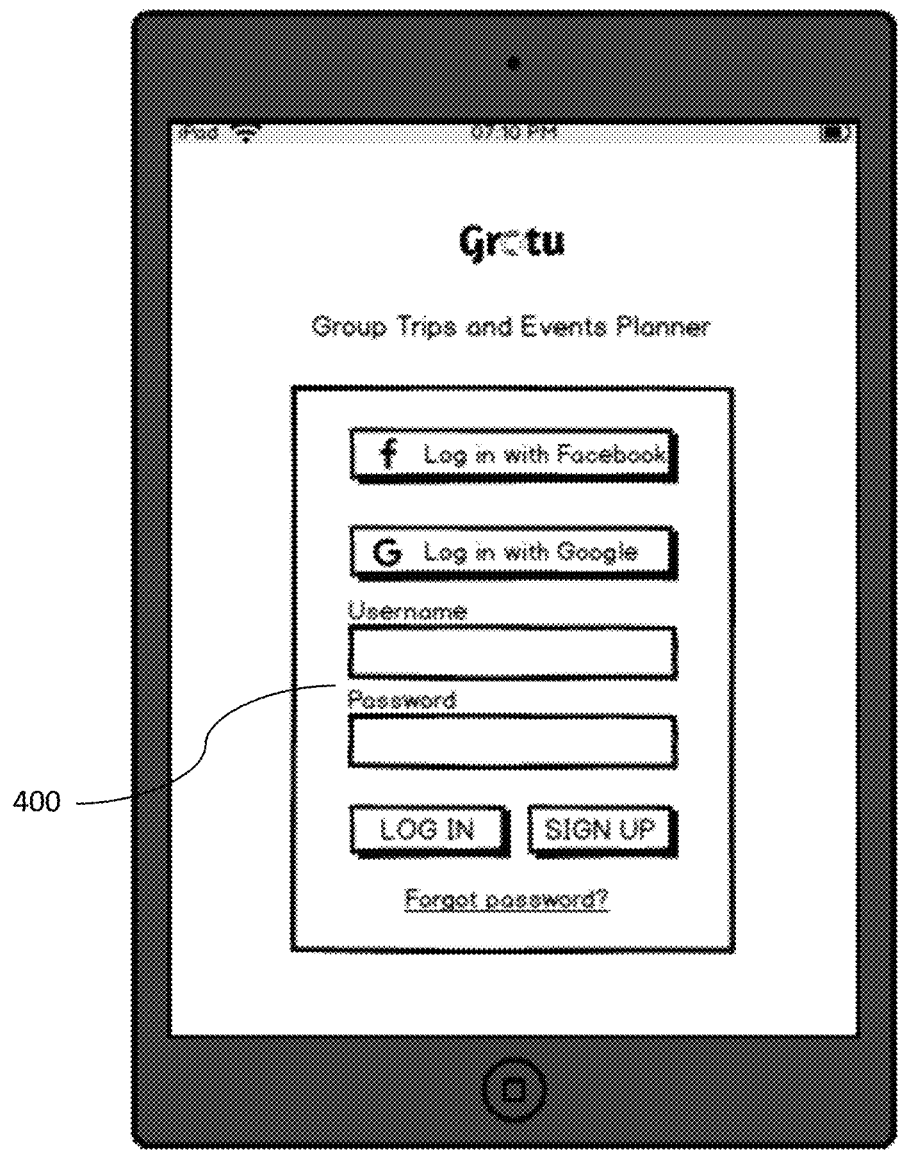
Figure 5:
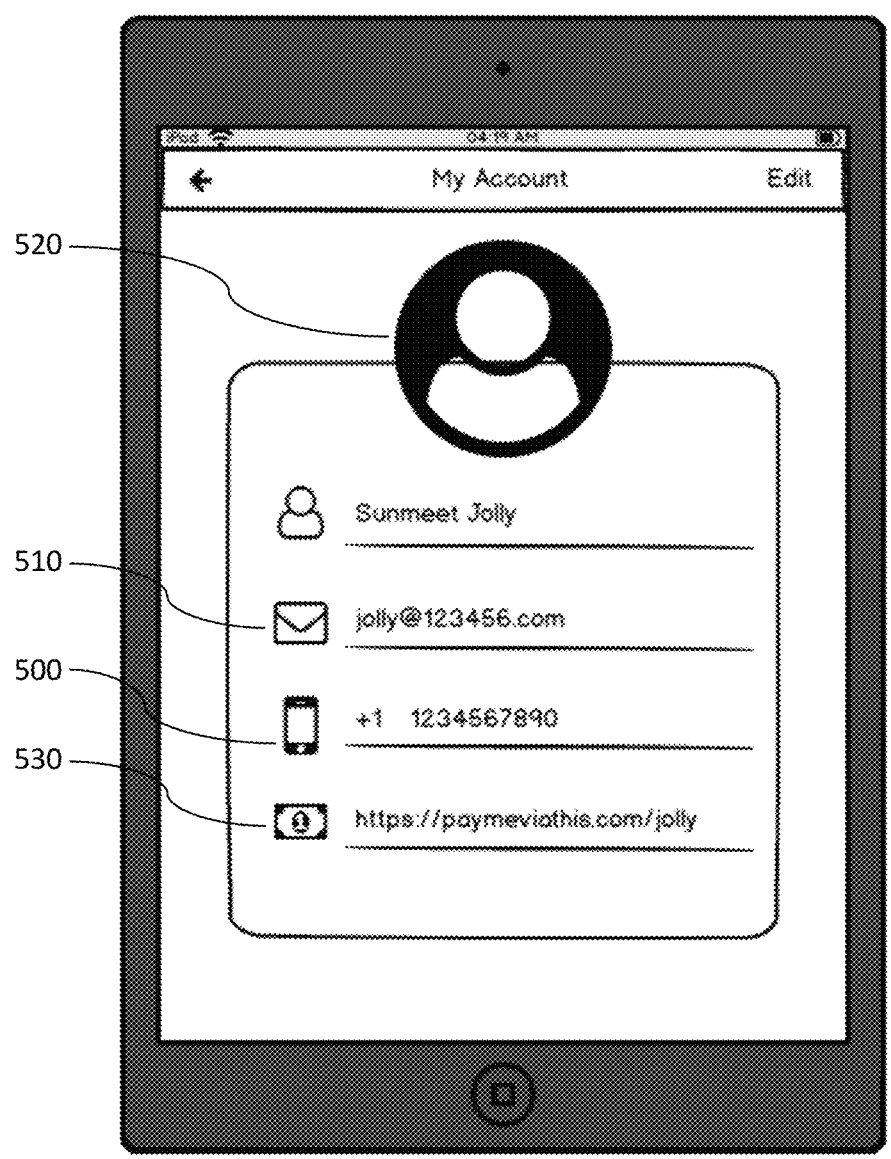
Figure 6:
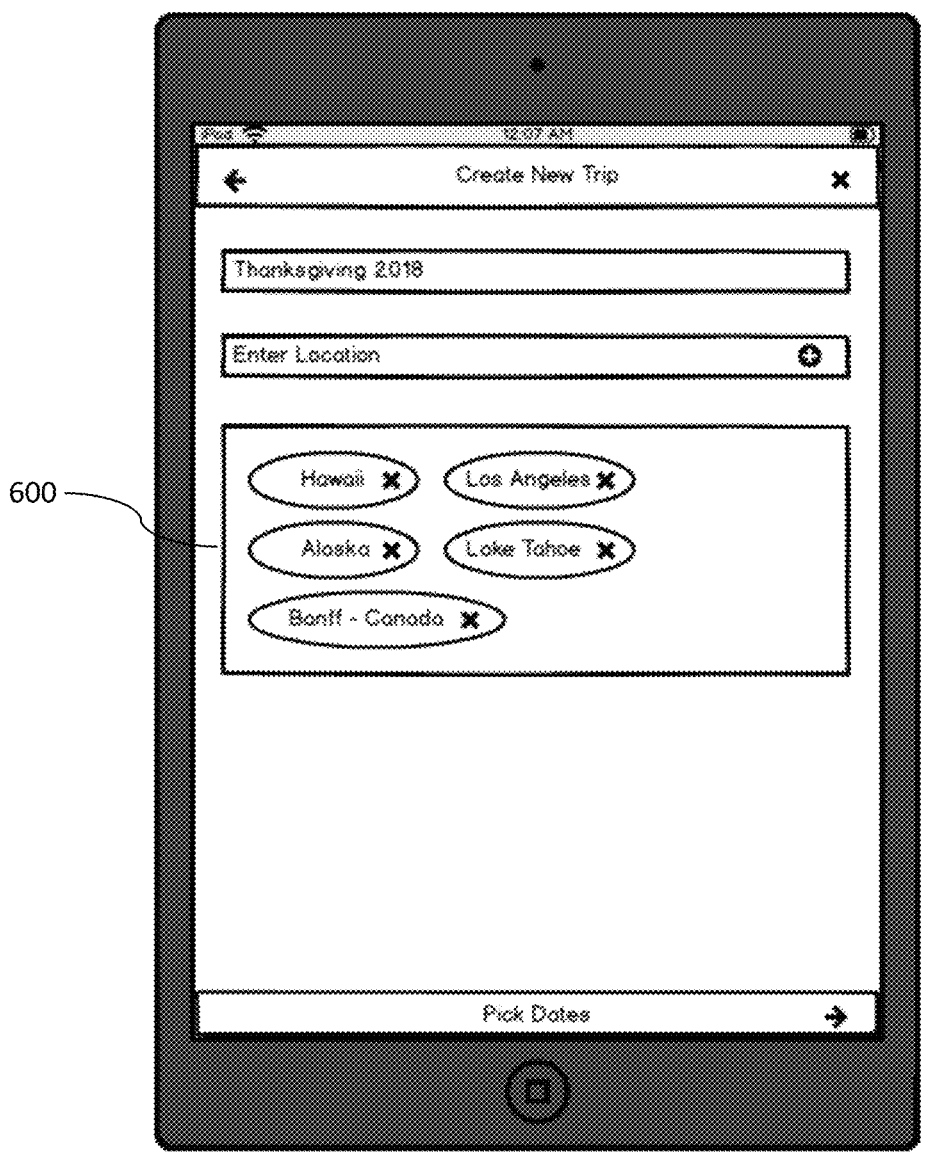
Figure 7:
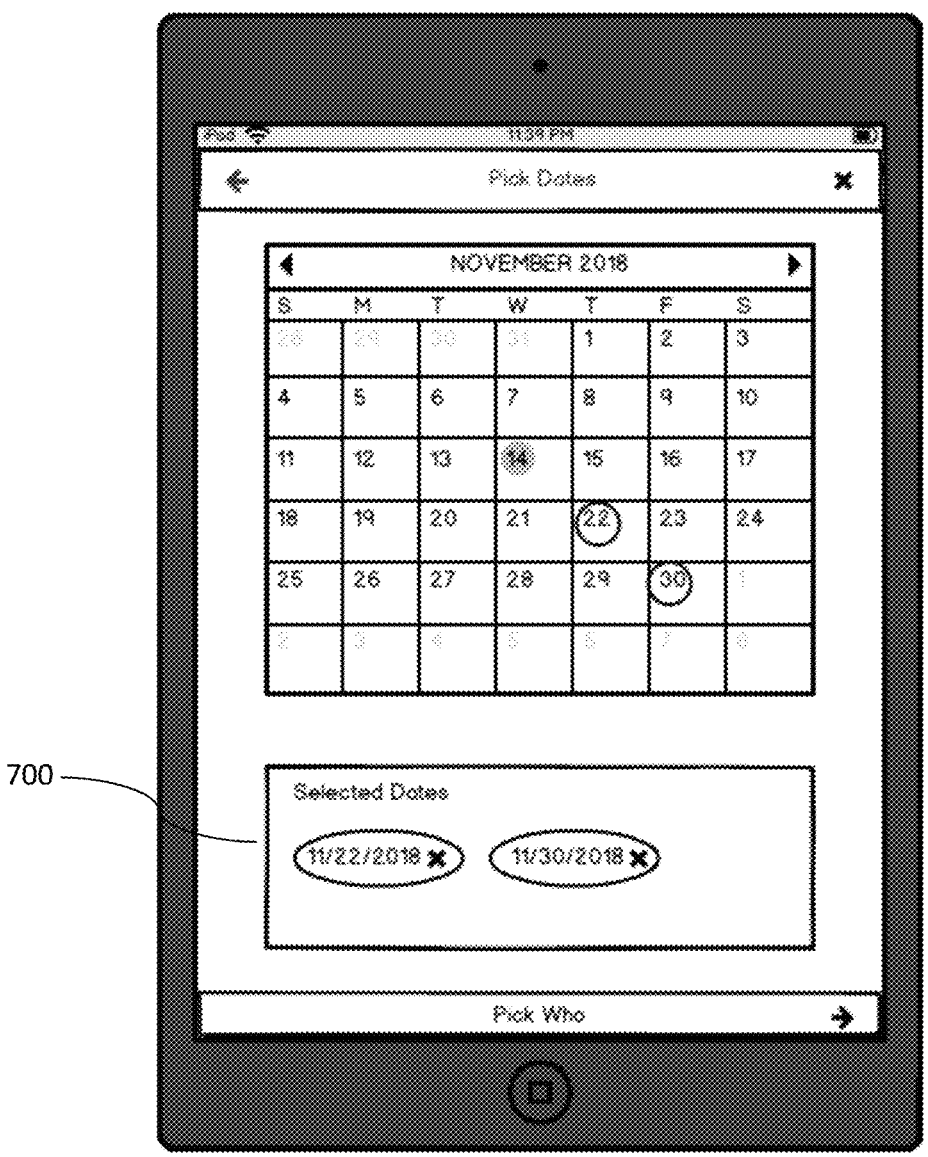
Figure 8:
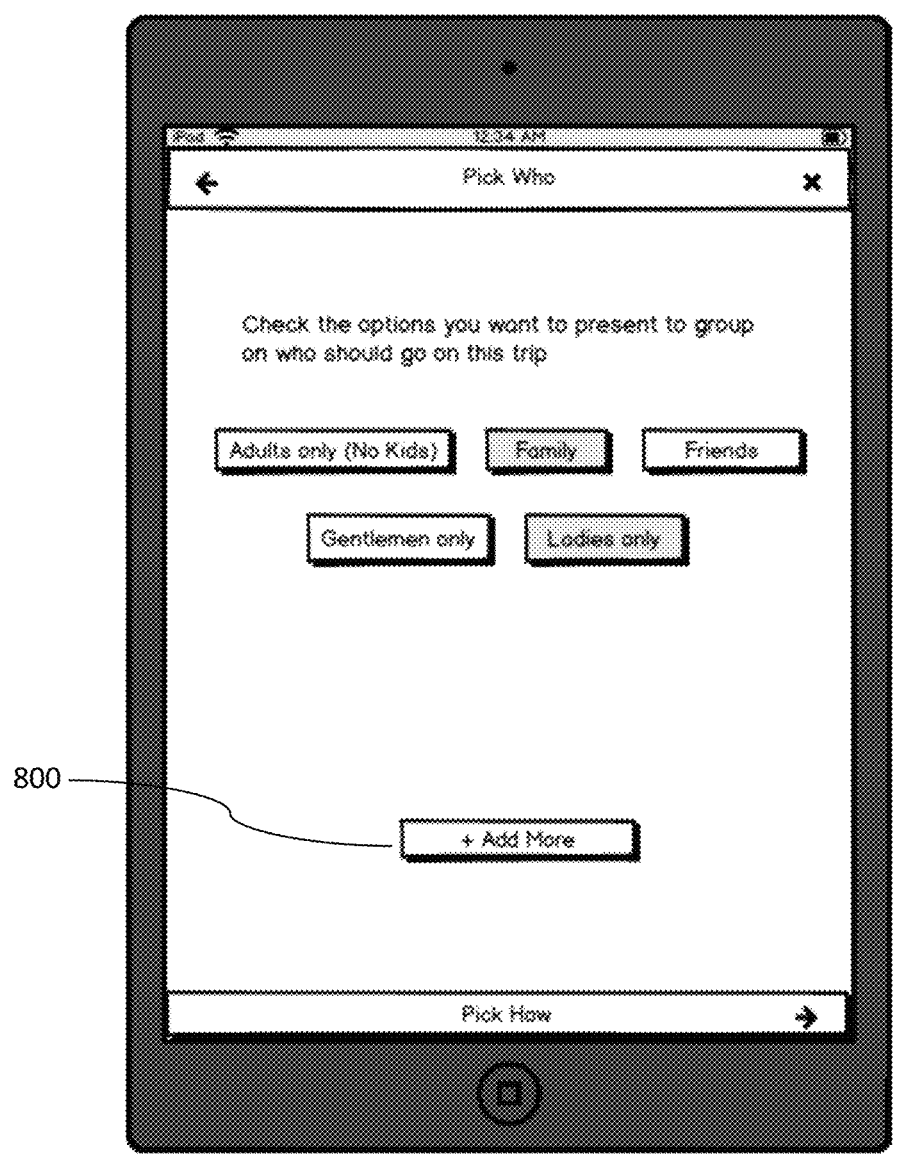
Figure 9:
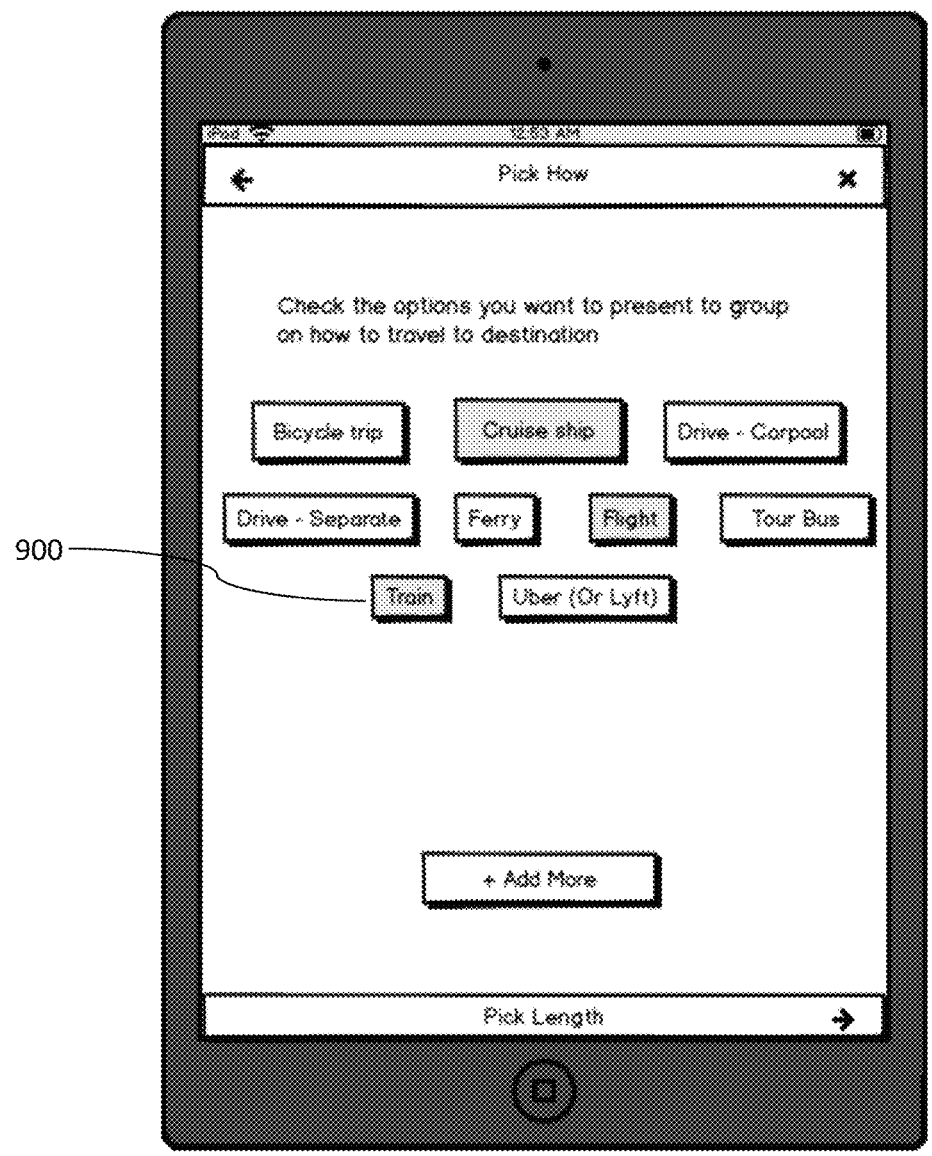
Figure 10:
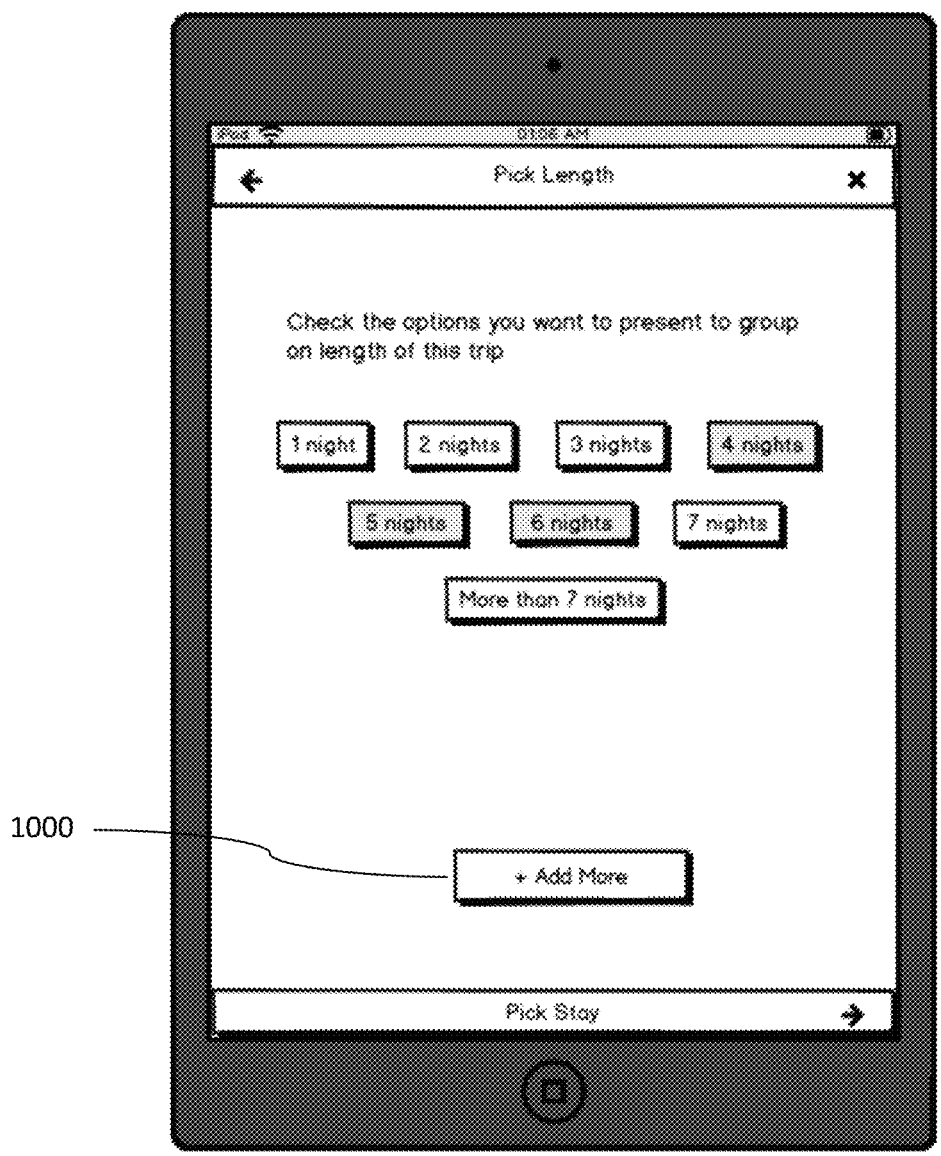
Figure 11:
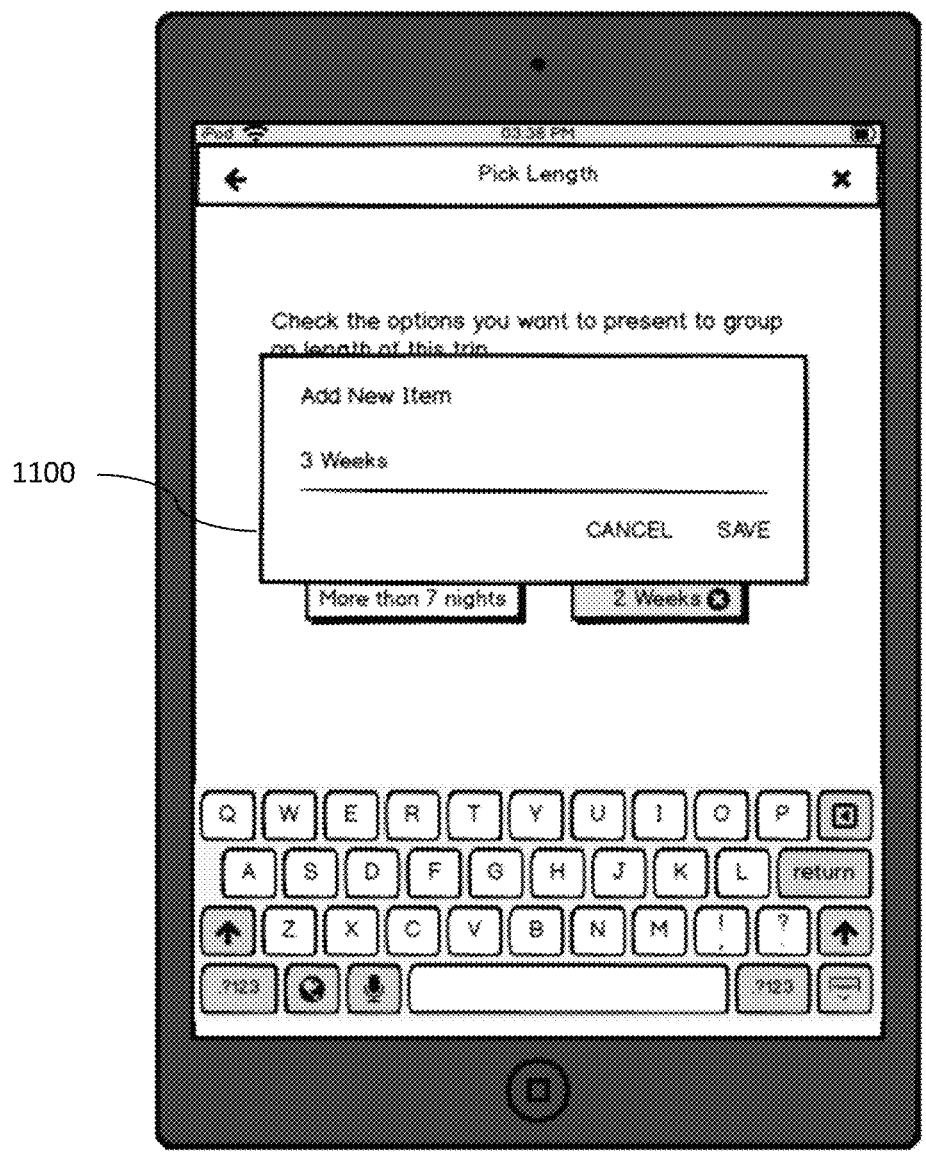
Figure 12:
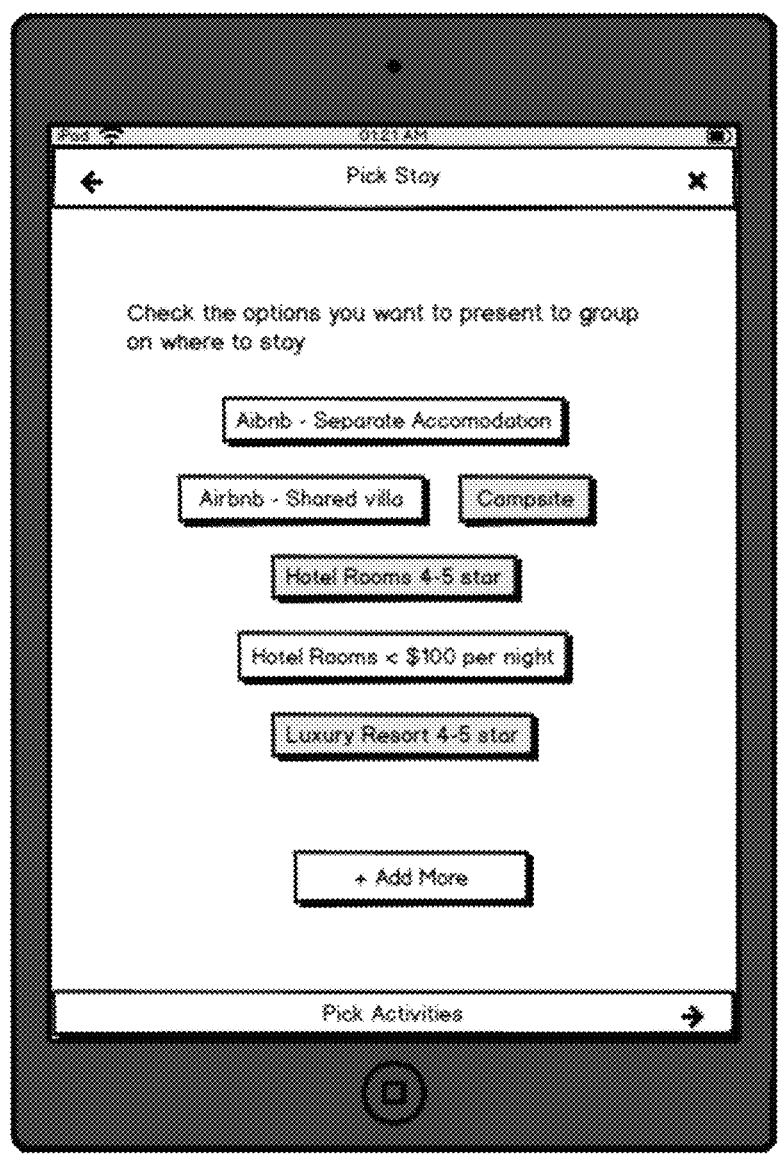
Figure 13:
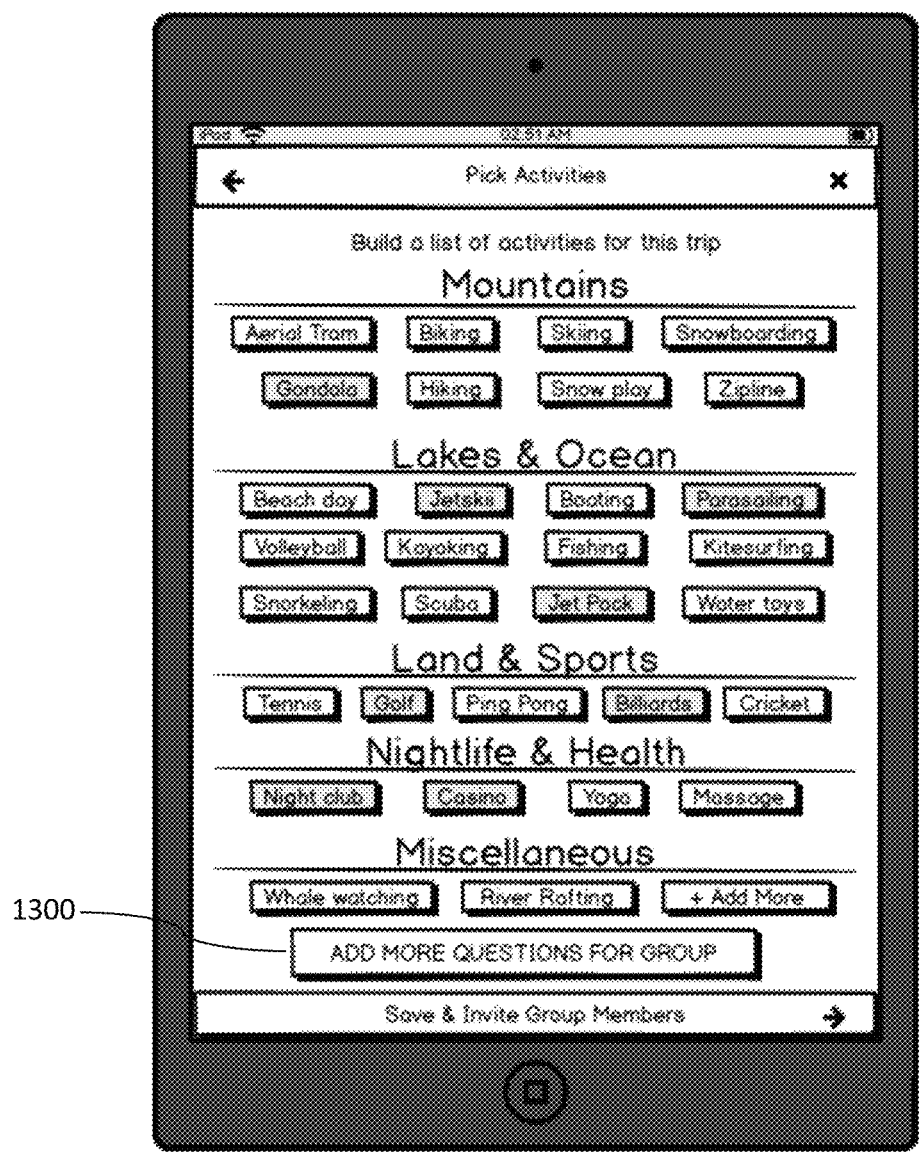
Figure 14:
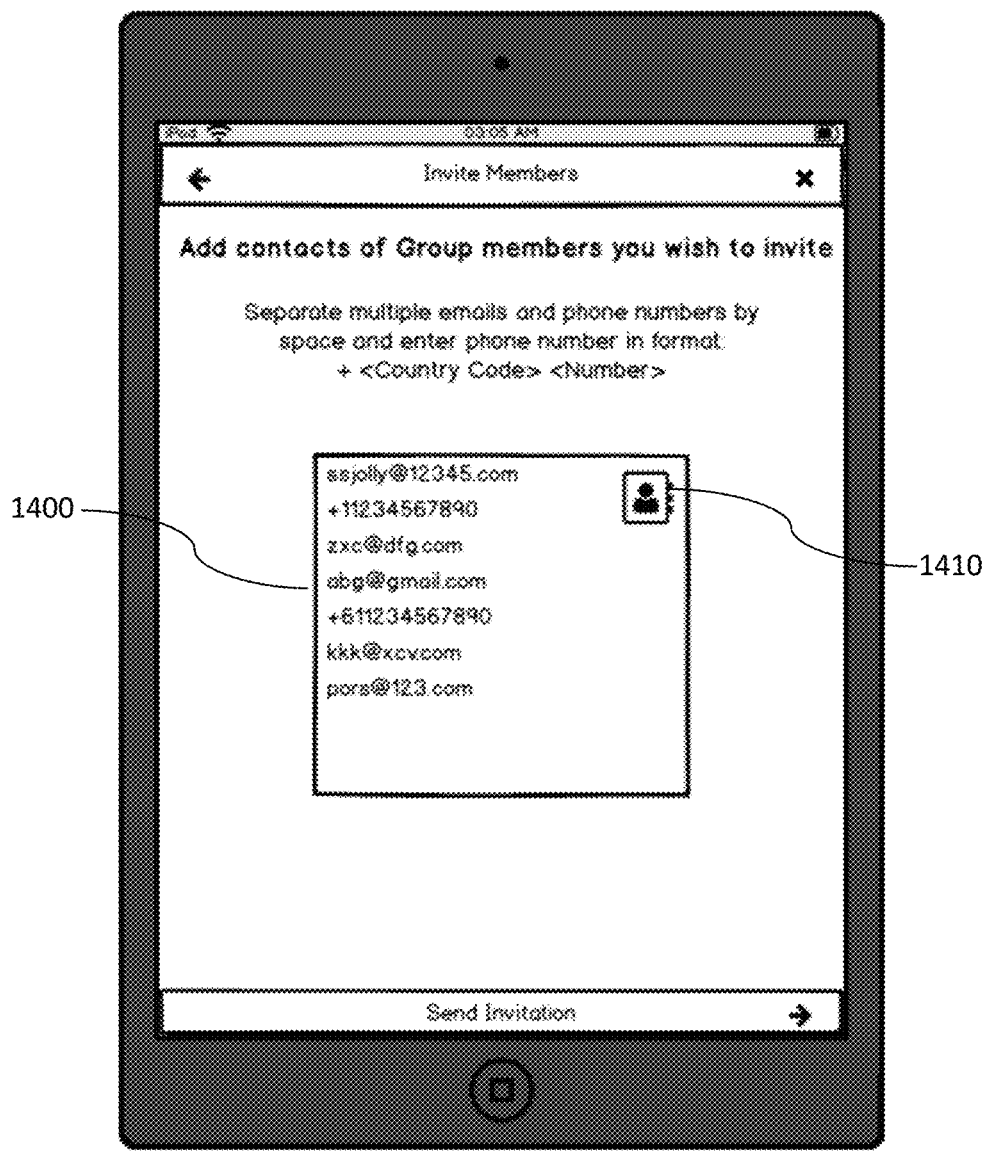
Figure 15:
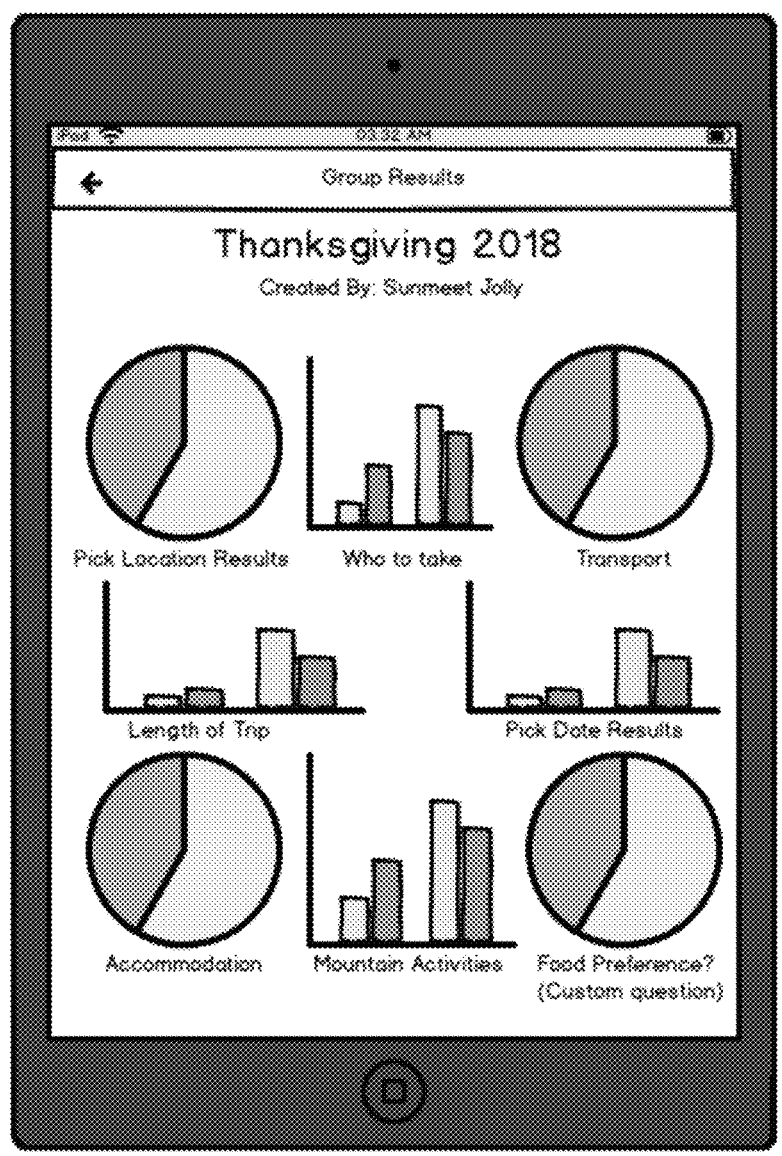
Figure 16:
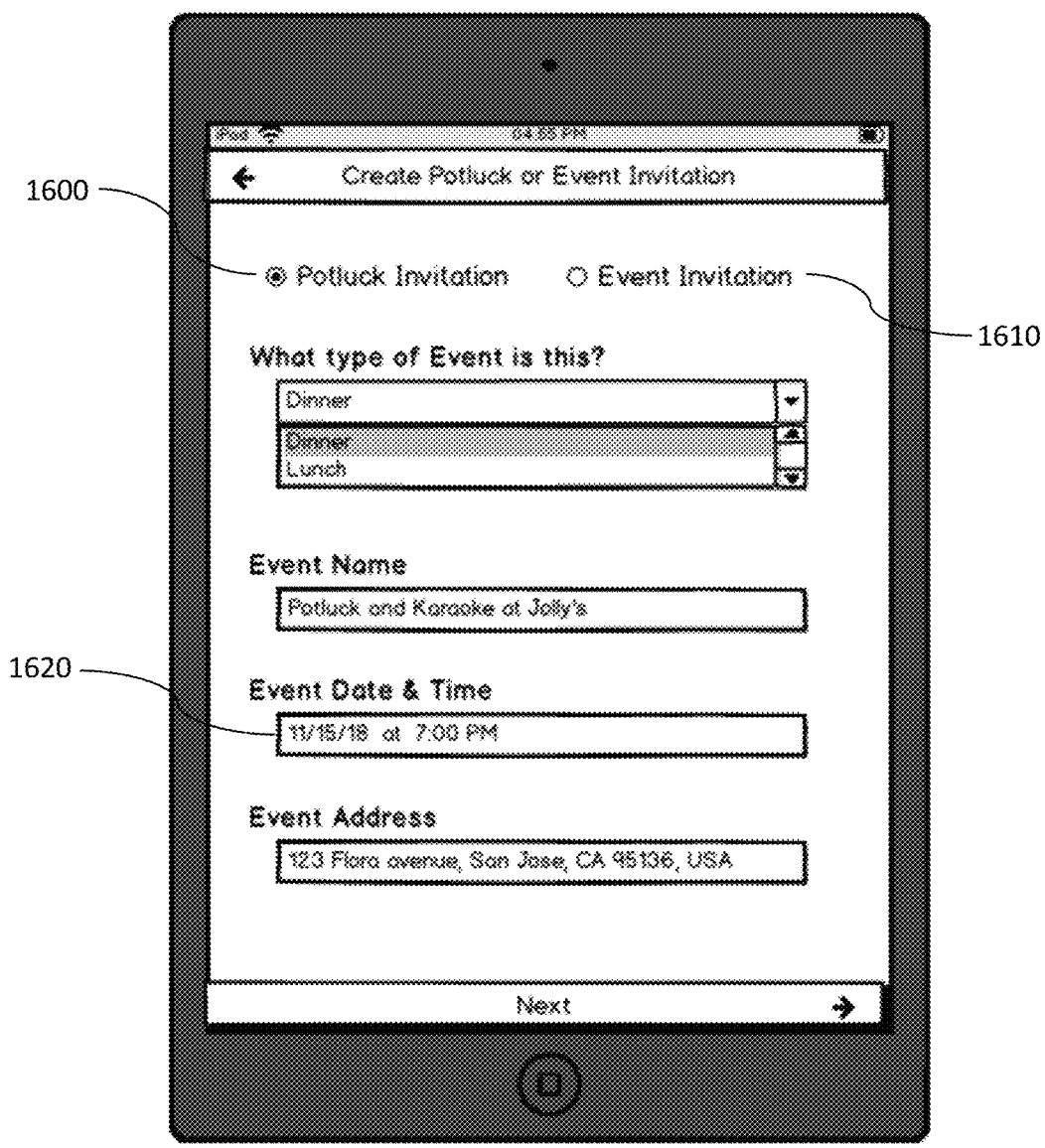
Figure 17:
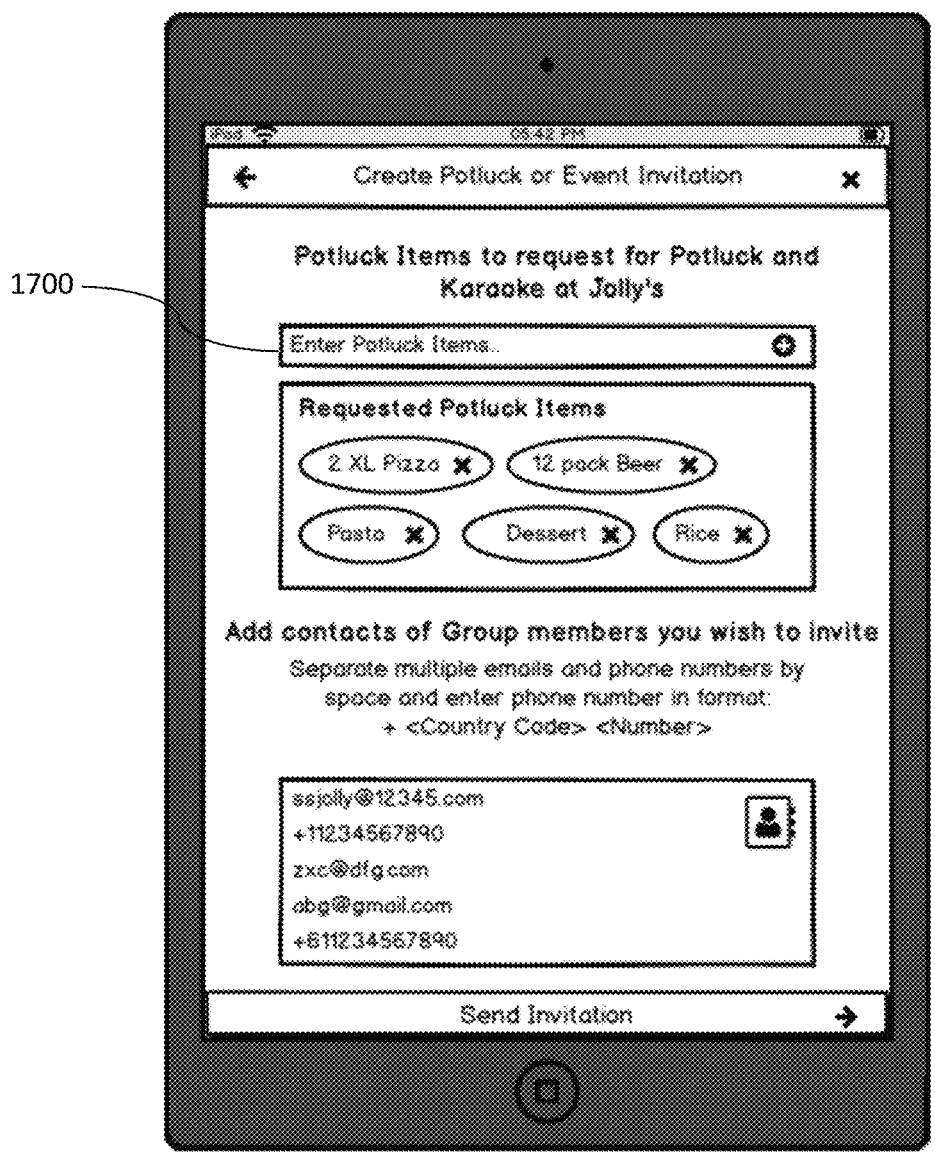
Figure 18:
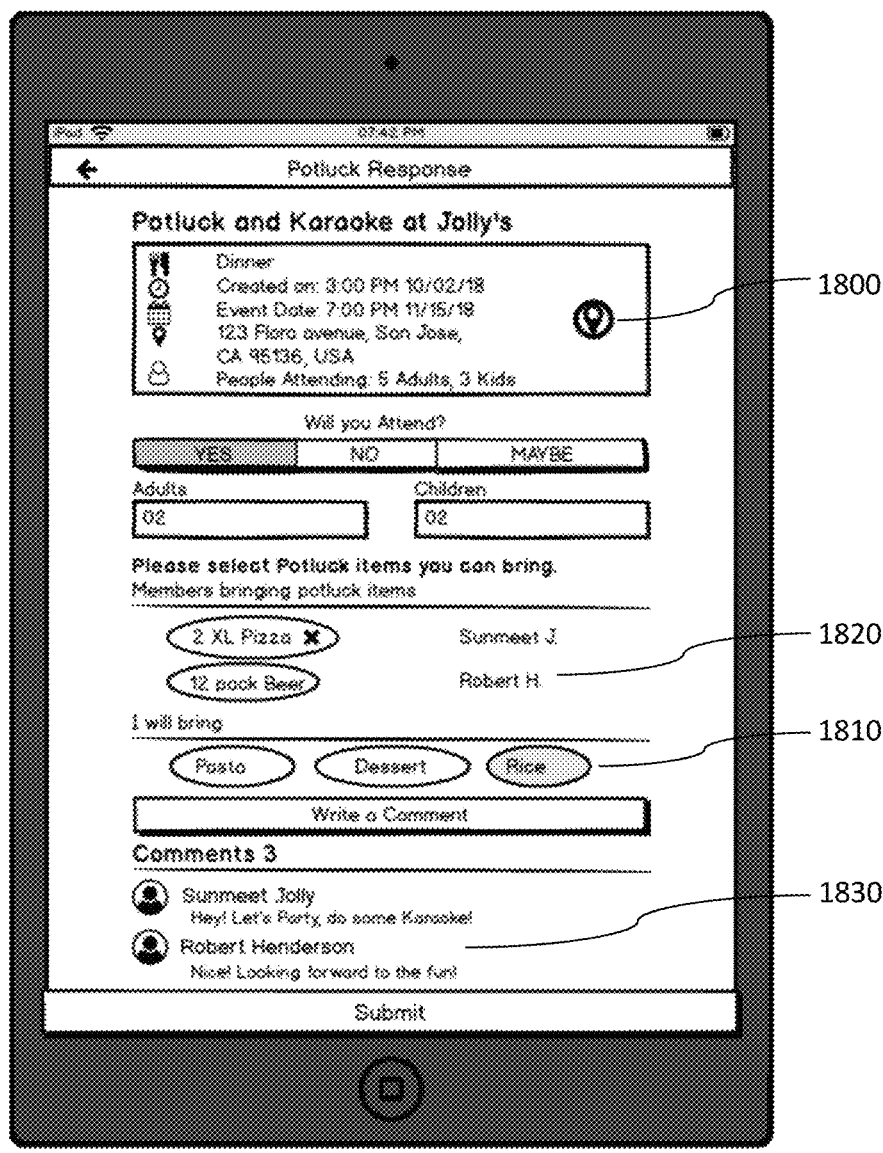
Figure 19:
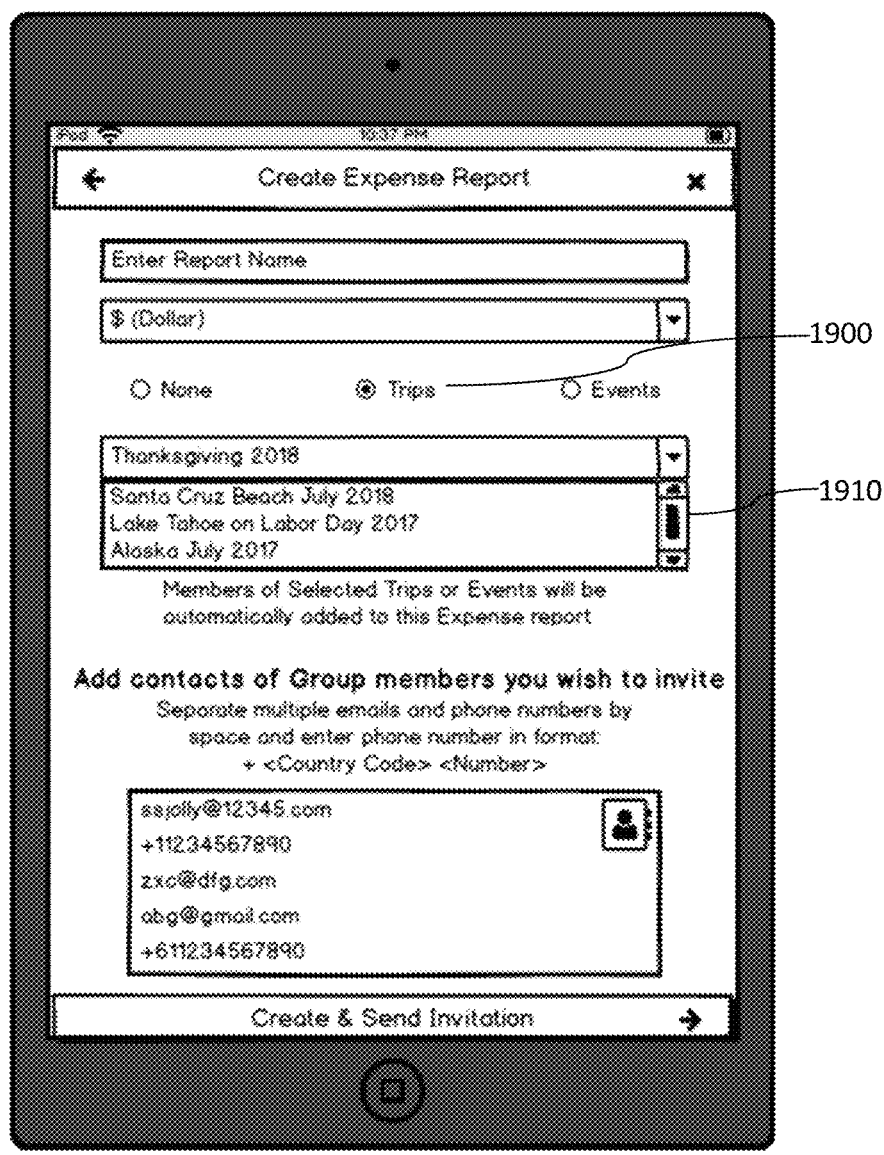
Figure 20:
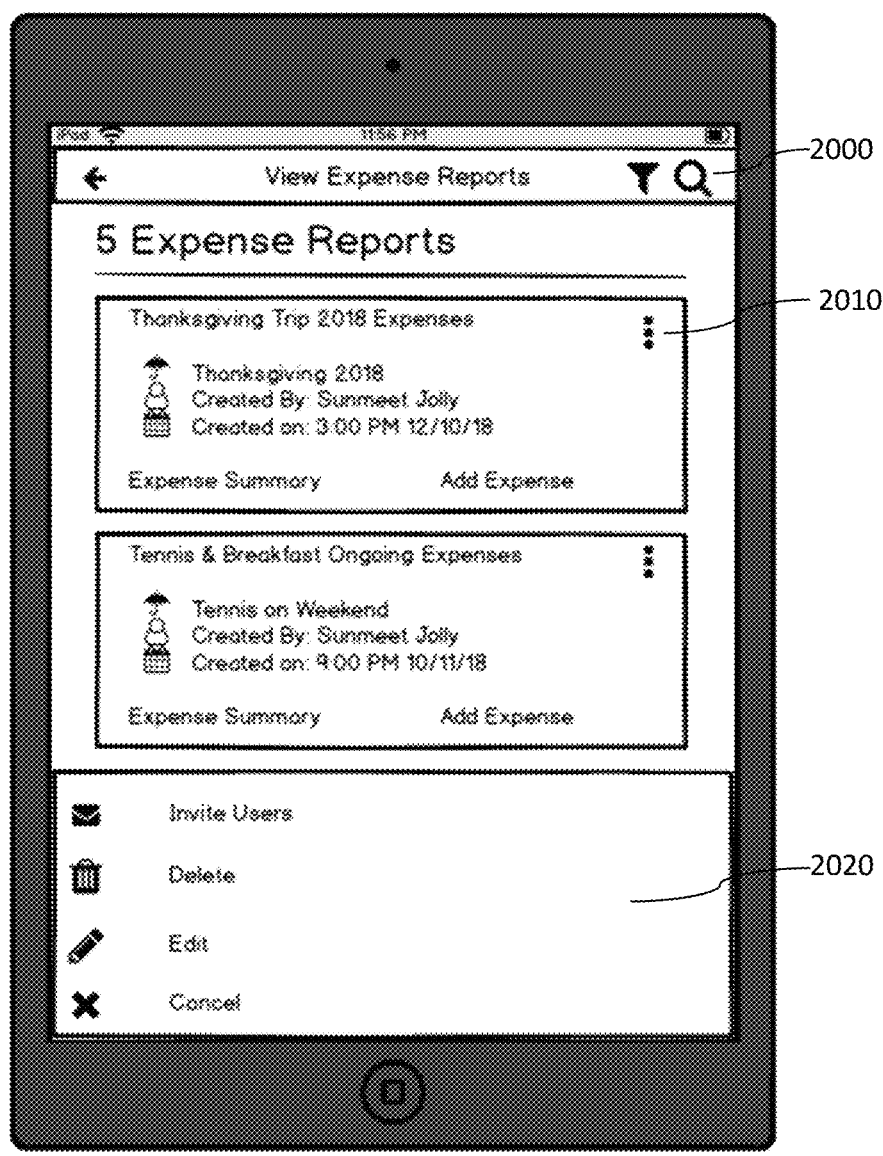
Figure 21:
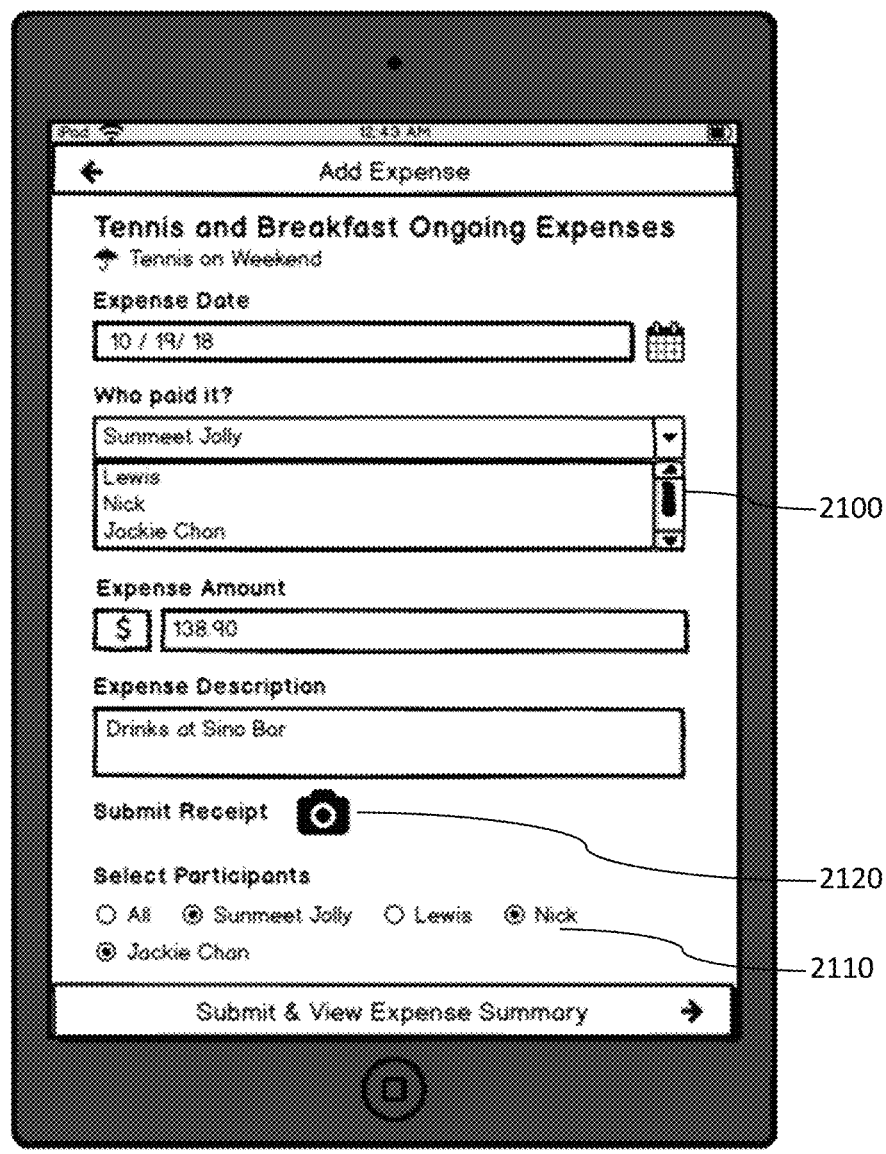
Figure 22:
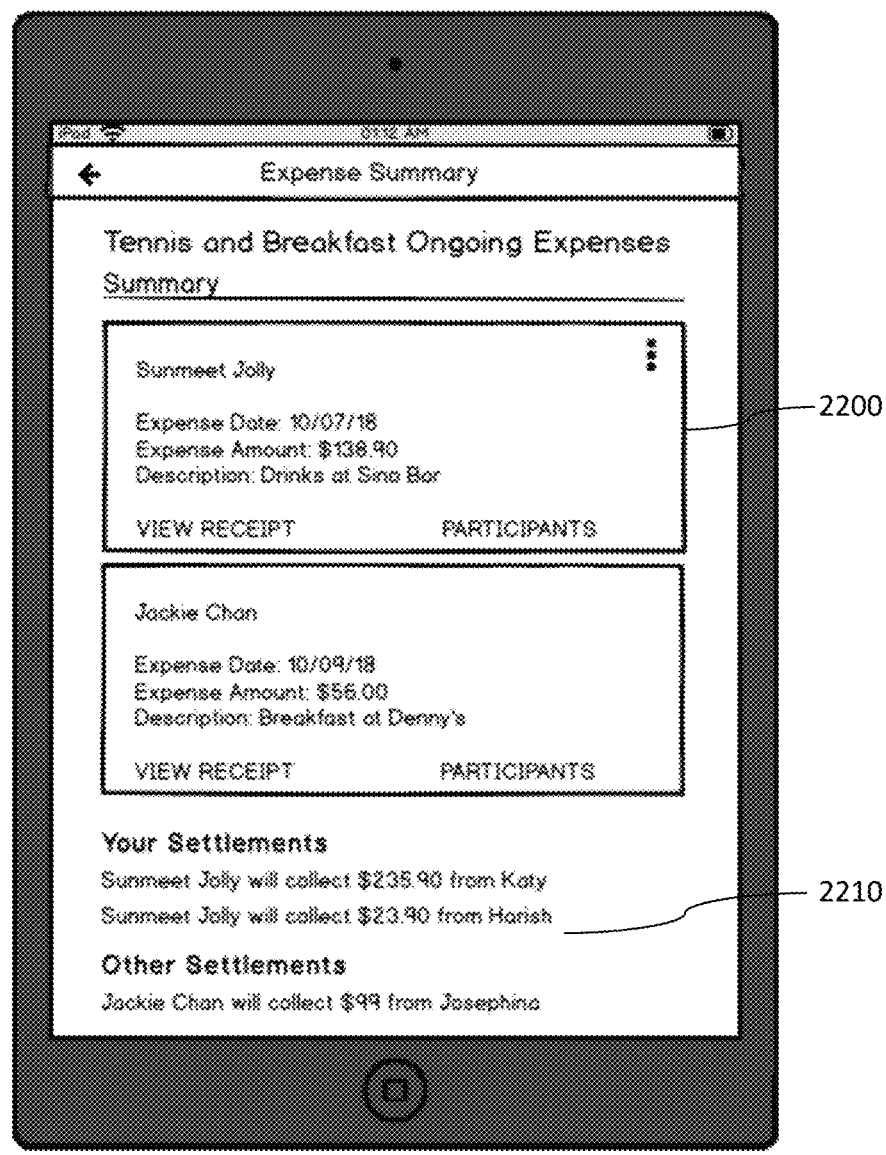
Figure 23:
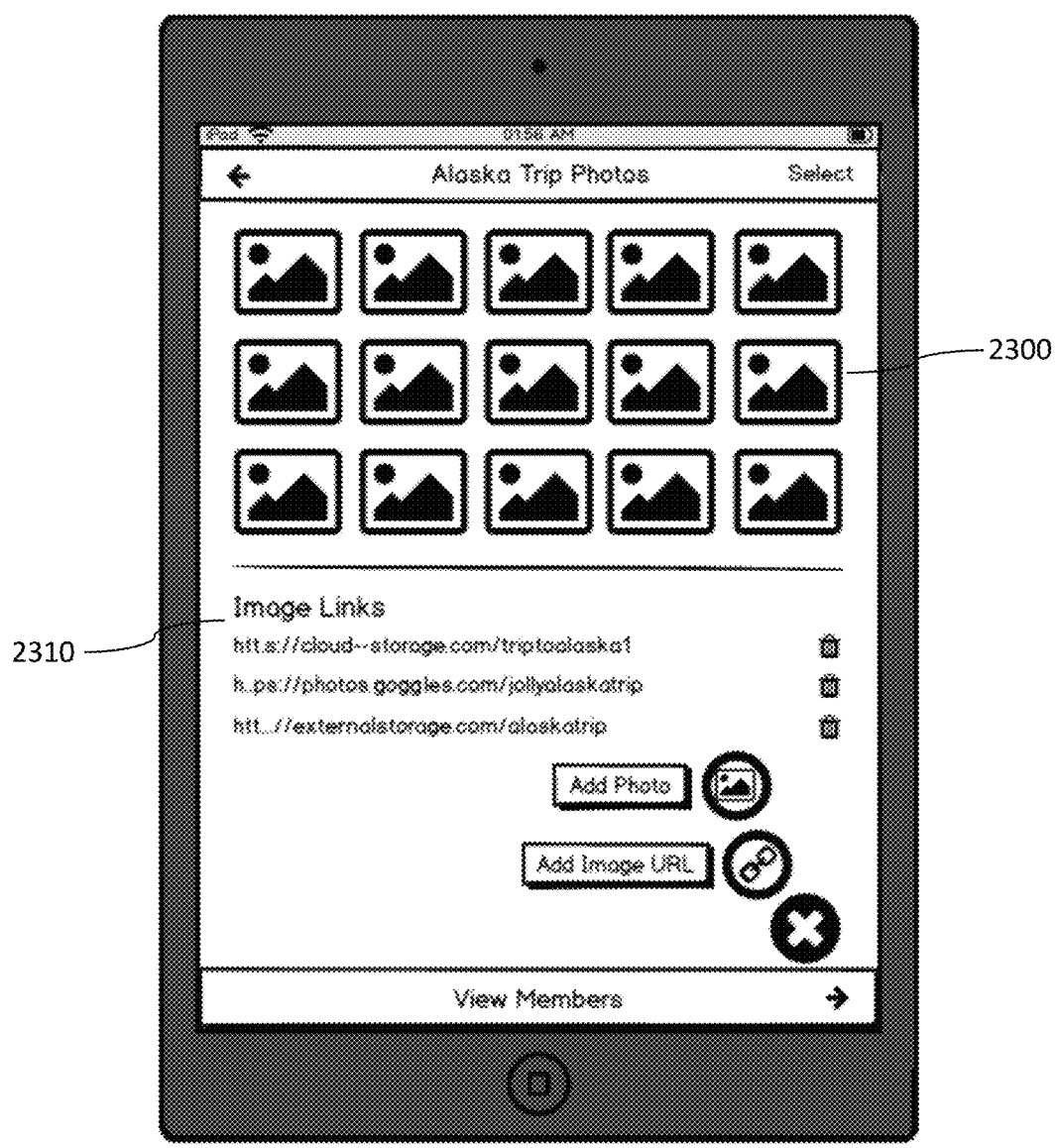

FIG. 3 depicts the Home screen of GROTU app with its major modules providing desired functionality FIG. 4 depicts Login and Signup user interface of GROTU app FIG. 5 depicts key account management fields in User profile FIG. 6 depicts the beginning screen of Travel survey creation process FIG. 7 shows date picker user interface for travel survey creation FIG. 8 shows a travel survey creation screen seeking group inputs on who to travel with FIG. 9 shows a travel survey creation screen seeking group inputs on transportation choices FIG. 10 depicts trip length options for travel survey creation FIG. 11 depicts user interface elements used to customize the travel survey FIG. 12 depicts stay options to choose for travel survey creation FIG. 13 shows a variety of pre-built activity list that survey creator can pick from FIG. 14 shows user interface for sending invitations to group members using email and phone numbers FIG. 15 depicts travel survey result charts after invited group members vote using their GROTU app accounts on their mobile phones FIG. 16 shows the user interface elements in GROTU app for creating a Potluck or Event invitation FIG. 17 further shows the steps of Potluck event creation and initiation workflow FIG. 18 shows user interface and steps required of a group member to respond to a potluck invitation including items view and group chat FIG. 19 shows user interface and workflow to create a group expense report using GROTU app FIG. 20 depicts user experience within GROTU app as it relates to search, filter, edit, inviting additional users, access and delete Expense reports or other records in app FIG. 21 depicts user interface elements and workflow to add a new expense to group expense report FIG. 22 shows how an expense summary and settlements are displayed to all group members participating in the expense report FIG. 23 depicts a group photo album where invited group members have contributed pictures and hyperlinks to any external storage site where they may have stored their trip photos

DETAILED DESCRIPTION OF THE EMBODIMENTS

The following description is intended to convey a thorough understanding of the invention by providing a number of specific embodiments and details involving a system and method for providing tools to help groups plan travel and events better, using modern hardware, software and processes. It is understood, however that the invention is not limited to these specific embodiments and details, which are exemplary only. It is further understood that one possessing ordinary skill in the art, in light of known systems and methods, would appreciate the use of the GROTU mobile app for its intended purposes and benefits in any number of alternative embodiments, depending upon specific design and other needs.

Figure 1:
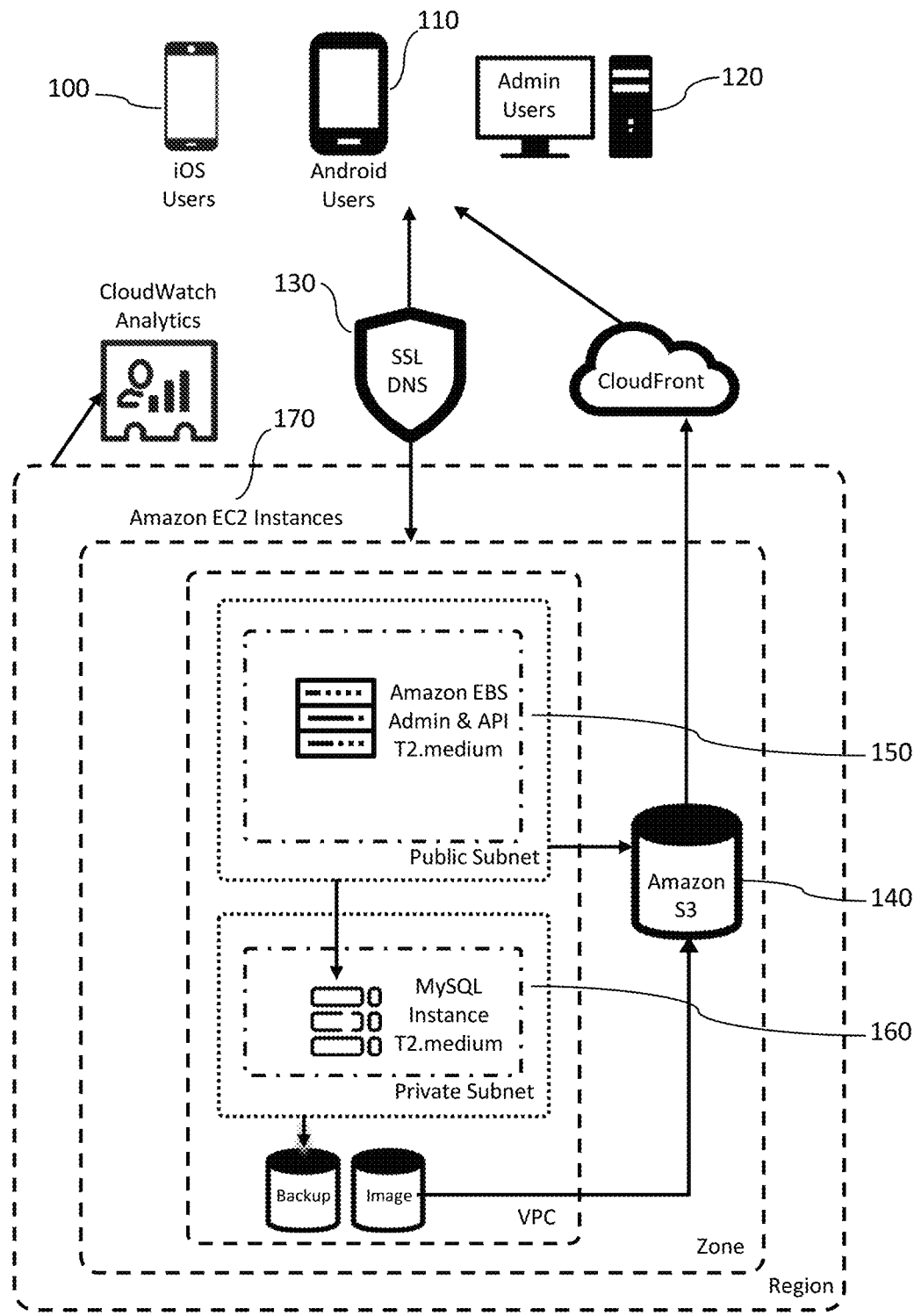
FIG. 1 is a block diagram depicting data synchronization between front end users using iOS and Android hardware devices running GROTU mobile app, Admin console users, and different components of backend Cloud infrastructure running on AWS (Amazon Web Services).

FIG. 1 is a block diagram depicting data synchronization between front end users using iOS hardware 100 and Android hardware devices 110 running GROTU mobile app, Admin console users 120, and different components of backend Cloud infrastructure running on AWS (Amazon Web Services). Essential to functioning of current embodiment of this invention, downloadable as GROTU mobile app, is extensive software development effort for these two distinct platforms. iOS devices such as iPhone and iPad run iOS software provided by Apple that only operates iOS mobile devices sold by Apple. iOS software 100 controls different parts of iPhones and iPads including but not limited to mobile device's random access memory (RAM), processor (CPU), display, graphical user interface (GUI) elements, camera, storage, phone contacts, messaging (SMS), email, maps (GPS), web browser, apps, photo storage etc. Building the GROTU app for iOS requires building, testing, getting Apple's approval and making the .IPA file available for download worldwide on Apple app store. An .IPA (iOS app store Package) file is an iOS application archive file which stores an iOS app. Each .IPA file includes a binary that can only be installed on an iOS 100 device. On the other hand, Android operating system provided by Google runs on a vast majority of phones and tablets in the world, manufactured and marketed by leading companies including Google, Samsung, Huawei, Oppo, LG, Xiaomi, Sony etc. Android OS controls different hardware and software components in these phones. Building GROTU app for Android phones 110 requires software development, testing, getting Google's approval and making the .APK file available for download worldwide on Google Play store or other Android stores. Android Package file (.APK) is the package file format used by Android operating system 110 for distribution and installation of mobile apps and middleware. Most phones in world are operated using either iOS or Android operating systems. Once the .IPA or .APK files are downloaded by users on their respective mobile devices, they can sign up and start using the GROTU app connecting with friends, family etc. to plan group travel and events effectively.

First embodiment of GROTU app uses internet cloud infrastructure provided by AWS (Amazon Web Services) including Amazon S3 140 to store image files, Amazon RDS 160 for operating scalable MySQL relational database servers 160 using Amazon EC2 web services 170 for scalable computing power and GoDaddy for DNS services and SSL 130 certificate. Within a Virtual private cloud (VPC), you can have a Private Subnet 160 containing MySQL database and also a Public Subnet 150 reachable from internet containing web server (NGINX). Admin console 120 that provides administrative access to user's data has a front end that can be accessed using internet browsers like Safari and Chrome. Admin users 120 have the ability to view partial user records and selectively erase user data and delete or disable user accounts upon request. Drupal CMS framework (PHP based) has been used in building internet browser based Admin console for GROTU app. Variety of other technologies including HTML, JavaScript, CSS, React etc. can also be used to build web front end for admin console or provide web access to users.

Figure 2:
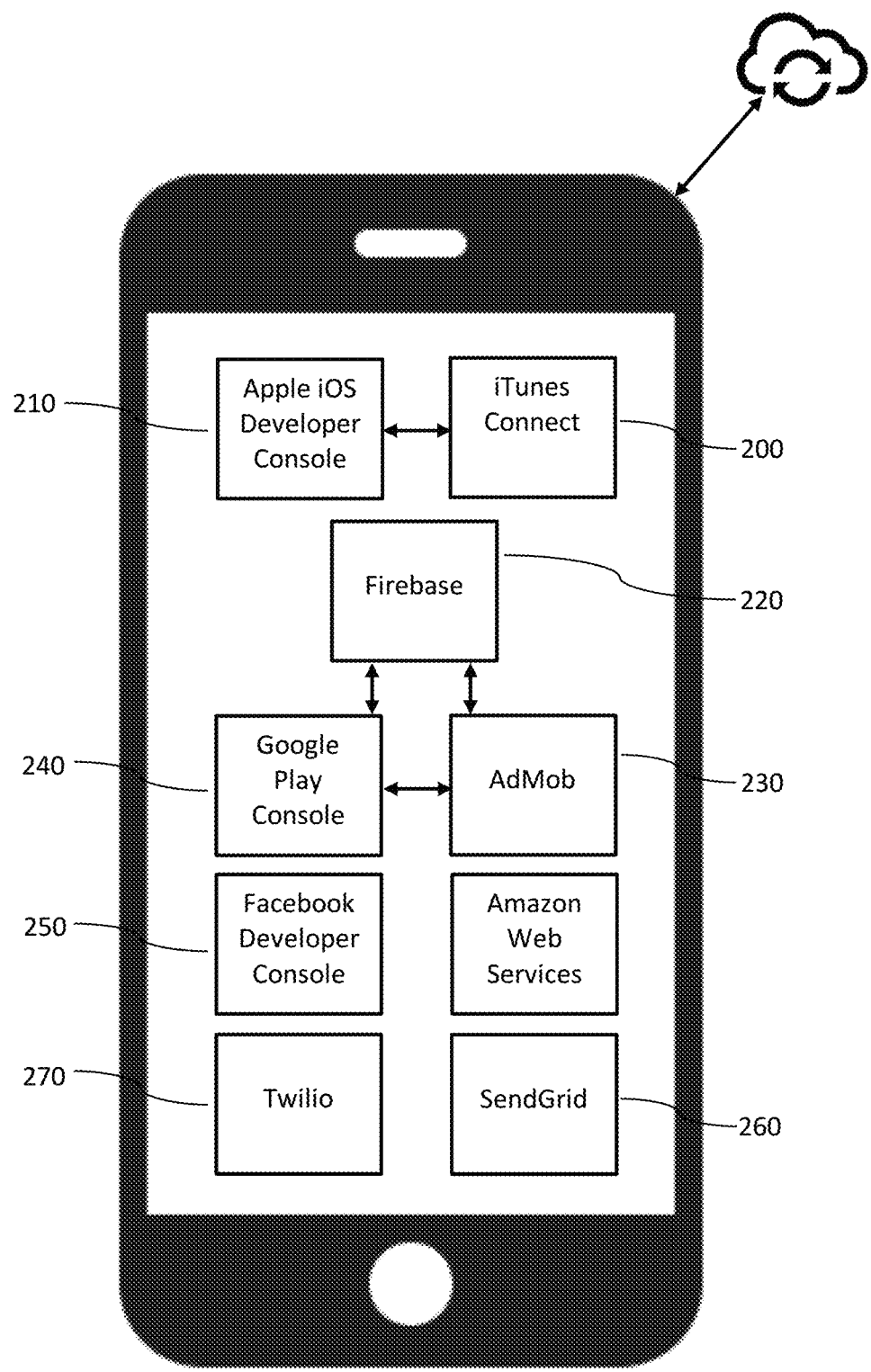
FIG. 2 depicts various building blocks of GROTU app, focusing on the APIs (Application Program Interfaces) and SDKs (Software Development Kits) used to build and operate the various mobile app functions of GROTU.

FIG. 2 depicts various building blocks of GROTU app, focusing on the APIs (Application Program Interfaces) and SDKs (Software Development Kits) used to build and operate the various mobile app functions of GROTU. To make this invention practicable, access to iOS developer console 210 and Google Play console 240 are must and can be obtained by registering in Apple developer program and Android developer's programs respectively. Sign up on iTunes connect 200 is required to release your app on Apple App Store. Both programs charge annual fee and provide access to their respective SDKs and APIs. GROTU Android Application (.APK) can be developed in Java programming language using the Android software development kit (SDK). A wide variety of IDEs and languages can be used for Android development but JAVA with Android Studio is most common and Google's preferred option. GROTU iOS app (.IPA) can be developed on Apple's Xcode Integrated development environment using Swift and Objective-C programming languages. However, we generated the native .APK and .IPA files for GROTU app using React Native framework which generates Native Android and iOS apps using open source components and libraries integrated using JavaScript and React. Because Apple desires specific language in app metadata related to in-app purchases and our iTunes 200 developer contract, we had to customize the iOS build a bit more before Apple approved it for downloading on App store. For Push notifications and other backend functions and analytics, we use Firebase 220 which is now owned by Google and is well integrated with Google Play console 240 and with AdMob 230 which is being used to serve interstitial and banner ads inside GROTU app. Login with Google is also enabled using Google developers 240 SDKs. Facebook developer console and APIs 250 provide Facebook login option for users and also Analytics and possibility of using Advertising services from Facebook ad network when desired. Twilio APIs 270 provide SMS ability inside GROTU app to help route invitation requests using worldwide phone numbers while SendGrid 260 is used to route email invitations to users. These technology stacks, APIs and SDKs are exemplary, considered best in trade and used by leading apps, however alternative embodiments of this invention can use other technologies like mobile phone SMS, email or other vendors including alternate advertising networks, own advertising contracts and may chose not to use social logins at all.

FIG. 3 illustrates the Home screen user interface of GROTU app with its major modules providing navigation to desired functionality. On top left is navigation menu UI control 360 that opens left side drawer of app with buttons and links to account management features, upgrades, social sharing links, push notifications settings etc. To Create a new Trip survey to be sent to group for voting, user clicks top left button 300 which takes the user to screen for starting survey creation. To view a list of Trip surveys that user created and was invited for, and to view Group results of those surveys, user needs to click "View Trips" button 310 that takes user to relevant screen in app for further action. Users click "Potluck, Party, Event Planner" button 320 to send or respond to Event invitations including Potluck invites and to chat with other group members regarding those events. To add or access group photo albums, user clicks the "Group photo organizer" 330 button. The "Create new expense report" button 340 takes users to screen for initiating a new expense report and inviting group members for that expense report. To view a list of Expense reports that user created or was invited to and to further access Expense addition menu and to view expense summary or receipts, user clicks the "View Expense Reports" 350 button.

FIG. 4 depicts Login and Signup user interface of GROTU app with three different ways for users to sign up and login. Besides social logins using Facebook account or Google account, users can use email and password 400 to create an account. A verification email is sent to user's email account with a link they need to click to authenticate the email. For such users, when they forget password, they can create new password by providing their email and a link is sent to their email that takes them to a screen on web browser window where they can enter a new password and confirm it. That resets the password for users.

FIG. 5 depicts key account management fields in User profile that can be accessed using "My account" link in left drawer from home screen. While email 510 and phone number 500 in correct format are mandatory for signing into GROTU app as each user account is uniquely identified using these fields, Payment option 530 and user's profile picture 520 are optional. GROTU's current embodiment does not process payments through the app and this field is for general information for anybody to externally transfer money to friends using means specified by user. User can use phone camera to take their photo and upload as profile picture 520 or add a photo from gallery.

FIG. 6 depicts the beginning screen of Travel survey creation process. At least one user needs to have GROTU app downloaded in their phone to start creating the survey and invite other members to vote on travel choices. User reaches this screen from Home screen and names the trip and enters all destinations 600 they want the invited members to vote on.

FIG. 7 shows date picker user interface for travel survey creation. The survey creator user picks a number of dates 700 for their group members to vote on, specifying their choice of when they want to go on the trip.

FIG. 8 shows a travel survey creation screen seeking group inputs on who to travel with. GROTU app provides a lot of pre-built options for survey creators to pick from, by simply clicking buttons. Because current embodiment has been designed to be customizable and scalable, user is given an option to add more answer choices 800 other than what are provided in the app.

FIG. 9 shows a travel survey creation screen seeking group inputs on transportation choices. By clicking buttons, the UI element 900 changes color and passes data to the backend server that becomes a part of survey sent to invited members to vote on.

FIG. 10 depicts trip length options for travel survey creation. By clicking "Add more" button 1000, user can add custom answers for group to vote on.

FIG. 11 depicts user interface elements used to customize the travel survey. After the user clicks "Add more" button 1000, a text input user interface 1100 appears along with a keyboard to type in additional answer choice.

FIG. 12 depicts stay options to choose for travel survey creation.

FIG. 13 shows a variety of pre-built activities list that survey creator can pick from. At the end of activities screen, survey creator user is given an option to "Add more questions for group" 1300 which upon clicking gives user an ability to enter one or more survey questions and their answer choices. This feature makes the Travel survey fully customizable while saving significant time for users by picking pre-built question and answer choices.

FIG. 14 shows user interface for sending invitations to group members using email and phone numbers. Using GROTU app, a user can send invitations to worldwide phones by entering phone numbers with country codes and email addresses 1400 separated by spaces. Survey creator user can click on phone book icon 1410 that opens phone contacts from which user can pick emails and phone numbers to send invitations out. In order to simplify sending out invitations, GROTU provides an ability to search phone book by names and also displays a list of frequently invited contacts before listing out the phone contacts. If a user is registered user for GROTU app and has app downloaded on their phone, they receive a Push notification and Badge notification, but if they have never downloaded the app, they receive an SMS or email from user inviting them through their GROTU account.

FIG. 15 depicts travel survey result charts after invited group members vote using their GROTU app accounts on their mobile phones. Each survey responder adds their vote from their GROTU account and the backend database gets updated in real time, dynamically changing the survey charts as votes from invited users pour in. Users can also change their responses anytime and results will instantly reflect the change in charts.

FIG. 16 shows the user interface elements in GROTU app for creating a Potluck or Event invitation. Using a simple click, users can toggle between a Potluck style invitation 1600 or an event invitation 1610 the difference being that Potluck style invitation allows event creator user to specify a list of items that invited users can chose to bring to the event. User input 1620 lets invitation creator pick date and time using mobile phone's native date and time pickers.

FIG. 17 further shows the steps of Potluck event creation and initiation workflow. User can enter a list of Potluck items 1700 or shared responsibilities that invited users can sign up for.

FIG. 18 shows user interface and steps required of a group member to respond to a potluck invitation including items view and group chat. Invited user can click on GPS icon 1800 that gives user the ability to select which maps or directions apps they want to choose from installations on their phones including but not limited to Apple Maps, Google maps, Waze etc. Further, while submitting their RSVP response for Potluck invitation, users can select from a list of items to bring 1810 and also see what other invited users are bringing 1820 to the event. GROTU allows users to chat with other invited users to an event or trip within these modules. This is an important feature of GROTU app as this chat 1830 is organized and focused on the event and happening between group members invited for this event, unlike chat apps where all sorts of news, jokes, talks are mixed up in daily chat volume.

FIG. 19 shows user interface and workflow to create a group expense report using GROTU app. An important feature of a feature rich app like GROTU is the ability of different modules to pass data between each other to save time for users. So after a trip or event is created and user decides to create an expense report or photo album for that trip or event, user can import all group members from the trip or event into expense report or photo album using single click on radio buttons 1900 provided, that invokes the drop down menu 1910 where a list of trips and events that user is part of appears. User can make this selection to invite members faster.

FIG. 20 depicts user experience within GROTU app as it relates to search, filter, edit, inviting additional users, accessing and deleting Expense reports or other records in app. GROTU allows searching and filtering 2000 records, and by clicking the 3-dot menu 2010 on records users have created themselves, a menu containing additional options to edit, delete or invite additional users 2020 pops up. Such advanced editing features are very user friendly as they provide the ability to edit invitations and invite additional friends because nobody is required to be perfect in creating and inviting the very first time.

FIG. 21 depicts user interface elements and workflow to add a new expense to group expense report. Expense report participants show up in a drop down menu 2100 to be selected based on who paid it, and to create an even split among expense participants, a radio button selection in end 2110 helps the app settle amounts between users. Users can use phone camera or photo roll to submit receipt 2120 for expense that GROTU maintains in cloud storage to be visible to all participants of that expense report.

FIG. 22 shows how an expense summary and settlements 2210 are displayed to all group members participating in the expense report. A list of expense entries 2200 is displayed with ability to view participants and receipts for each expense.

FIG. 23 depicts a group photo album where invited group members have contributed pictures 2300 and hyperlinks 2310 to any external storage site where they may have stored their trip photos. These photos are stored by GROTU app in Amazon S3 servers. Ability to store hyperlinks and pictures in same album ensures that all friends can contribute to an album regardless of which provider they chose to store their pictures with.

While the above description contains many specificities, these should not be construed as limitations on the scope of any embodiment, but as exemplifications of various embodiments thereof. Many other ramifications and variations are possible within the teachings of the various embodiments. For example, its possible to develop the GROTU mobile app for functioning on phones that are neither iOS nor Android, like smartphones running on Blackberry OS, Windows mobile etc. Also, another embodiment can be a web browser based application that can be accessed on popular web browsers like Chrome, Safari, Internet explorer, Firefox etc. on laptops, desktop and phones/tablets. It is also possible to add additional modules to GROTU app to add functionality that can help groups in travel and event planning. Also, we can alter, reduce or expand functionality of each module, like adding additional questions and answers to travel survey, increasing the number of event notifications app sends out to users and at what intervals, adding additional features to chat and adding chat to other modules where it's not available, supporting variety of media files other than images, processing payments through the app or integrating APIs of payment gateways, banks etc. with the app.

Thus the scope should be determined by the appended claims and their legal equivalents, and not by the examples given.

What is claimed is:

1. A method of managing group travel and events using mobile smartphone and computer applications comprising:
   downloading and installing a mobile application on smartphones running on an operating system;
   creating user accounts with unique identification that may include mobile phone number and email address to sign up users from around the world;
   administering user accounts providing admin account holders the ability to analyze, disable or delete user accounts or user data;
   providing a first user interface giving users an ability to invite other users using phone numbers or email addresses to collaborate in private groups using different functions of the mobile application;
   creating private invite only networks to facilitate data and image exchanges between users using the internet;
   creating and deleting virtual private networks based on user needs and functionality implemented in the mobile application;
   processing and storing user data and images, by the mobile smart phone, using relational databases and cloud computing services;
   providing a second user interface allowing users to:
      create travel survey by picking from a list of questions and answers provided by the mobile application;
      add additional answer choices and additional questions and answers to expand the scope of travel survey provided by the application;
      respond to travel survey requests and view survey results;
      send event invitations to other users via the application;
      specify a list of potluck items or shared responsibilities for other invited user members to select from;
      view the event invitation and respond with theft choices picking potluck items or shared tasks and view what other invited users have picked and what's still available for them to pick;
      create a shared group expense report and invite other users to view expense summary and add expenses and specify the expense participants for each expense for enabling the application to calculate dues between members;
   capturing expense receipt images, using mobile phone camera, and adding the receipt images captured by the camera or previously stored in a photo gallery;
   maintaining a ledger balance with the photo receipts for expense reports in cloud storage;
   providing a third user interface allowing users to:
      create photo albums in cloud storage along with hyperlink storing and photo thumbnail displaying ability in each photo album;
      invite other members to upload, download and share online links to photos in each gallery;

post comments and have discussions within group trips and events they are planning.

2. The method of claim 1, wherein a toggle switch or single click on radio button user interface can invoke software modules on the mobile application, that allow users to create potluck items list including specifying any shared responsibilities for event that a group of users are being invited to.

3. The method of claim 1, wherein mobile phone SMS, email, push notifications and badge notifications are used to invite and alert other users to privately participate in group travel surveys, group expense sharing, group photo albums and group events organizing.

4. The method of claim 1, wherein group members invited to an event or trip survey can be invited for an expense report or photo album by selecting from a menu providing a list of those events and trips.

5. The method of claim 1, wherein the mobile application displays charts including pie charts, bar charts and corresponding data to all group members invited to a travel survey.

6. The method of claim 1, wherein invited members to a group expense report are listed in expense addition menu for users to select expense payor as well as expense participants.

7. A system comprising computer hardware, software, internet web services, mobile smartphones, mobile operating systems, mobile applications, web applications, integrated software modules exchanging and processing data and images between users, providing group tools to help in managing group travel and events including but not limited to expandable group travel surveys, event invitations, group expense reports and group photo sharing modules, wherein the mobile smartphones include user interfaces allowing users to:

invite other users using numbers or email addresses to collaborate in private groups using different functions of the mobile application;

create private invite only networks to facilitate data and image exchanges between users using the internet;

create and delete virtual private networks based on user needs and functionality implemented in the mobile application;

create travel survey by picking from a list of questions and answers provided by the mobile application;

add additional answer choices and additional questions and answers to expand the scope of travel survey provided by the mobile application;

respond to travel survey requests and view survey results;

send event invitations to other users via the mobile application;

specify a list of potluck items or shared responsibilities for another invited user members to select from;

view the event invitation and respond with their choices picking potluck items or shared tasks and view what other invited users have picked and what's still available for them to pick;

create a shared group expense report and invite other users to view expense summary and add expenses and specify the expense participants for each expense for enabling the application to calculate dues between members;

create photo albums in cloud storage along with hyperlink storing and photo thumbnail displaying ability in each photo album;

invite other members to upload, download and share online links to photos in each gallery; and post comments and have discussions within group trips and events they are planning.

* * * * *